United States Patent
Sarkar et al.

(10) Patent No.: US 12,430,934 B2
(45) Date of Patent: Sep. 30, 2025

(54) UTILIZING IMPLICIT NEURAL REPRESENTATIONS TO PARSE VISUAL COMPONENTS OF SUBJECTS DEPICTED WITHIN VISUAL CONTENT

(71) Applicant: Adobe Inc., San Jose, CA (US)

(72) Inventors: Mausoom Sarkar, New Delhi (IN); Nikitha S R, Namakkal (IN); Mayur Hemani, Noida (IN); Rishabh Jain, Gurgaon (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 375 days.

(21) Appl. No.: 18/316,617

(22) Filed: May 12, 2023

(65) Prior Publication Data
US 2024/0378912 A1    Nov. 14, 2024

(51) Int. Cl.
*G06V 20/70* (2022.01)
*G06T 3/4046* (2024.01)
(Continued)

(52) U.S. Cl.
CPC .......... *G06V 20/70* (2022.01); *G06T 3/4046* (2013.01); *G06T 7/11* (2017.01); *G06V 10/46* (2022.01);
(Continued)

(58) Field of Classification Search
CPC ...... G06V 20/70; G06V 10/46; G06V 10/764; G06V 10/7715; G06V 10/774;
(Continued)

(56) References Cited

U.S. PATENT DOCUMENTS

| | | | |
|---|---|---|---|
| 11,971,955 B1 * | 4/2024 | Chakraborty | ....... G06F 3/04845 |
| 2015/0279113 A1 * | 10/2015 | Knorr | ....... G06T 7/11 |
| | | | 345/633 |

(Continued)

OTHER PUBLICATIONS

Sarkar, M. "Parameter Efficient Local Implicit Image Function Network for Face Segmentation" 2023 IEEE/CVF Conference on Computer Vision and Pattern Recognition (CVPR), p. 20970-20980, pp. 1-11. (Year: 2023).*

(Continued)

*Primary Examiner* — Mia M Thomas
(74) *Attorney, Agent, or Firm* — Keller Preece PLLC

(57) ABSTRACT

This disclosure describes one or more implementations of systems, non-transitory computer-readable media, and methods that utilize a local implicit image function neural network to perform image segmentation with a continuous class label probability distribution. For example, the disclosed systems utilize a local-implicit-image-function (LIIF) network to learn a mapping from an image to its semantic label space. In some instances, the disclosed systems utilize an image encoder to generate an image vector representation from an image. Subsequently, in one or more implementations, the disclosed systems utilize the image vector representation with a LIIF network decoder that generates a continuous probability distribution in a label space for the image to create a semantic segmentation mask for the image. Moreover, in some embodiments, the disclosed systems utilize the LIIF-based segmentation network to generate segmentation masks at different resolutions without changes in an input resolution of the segmentation network.

20 Claims, 11 Drawing Sheets

(51) Int. Cl.

| | | |
|---|---|---|
| *G06T 7/11* | (2017.01) | |
| *G06V 10/46* | (2022.01) | |
| *G06V 10/764* | (2022.01) | |
| *G06V 10/77* | (2022.01) | |
| *G06V 10/774* | (2022.01) | |
| *G06V 10/82* | (2022.01) | |
| *G06V 40/16* | (2022.01) | |

(52) U.S. Cl.
CPC ........ *G06V 10/764* (2022.01); *G06V 10/7715* (2022.01); *G06V 10/774* (2022.01); *G06V 10/82* (2022.01); *G06V 40/171* (2022.01); *G06V 40/172* (2022.01); *G06T 2207/20021* (2013.01); *G06T 2207/20076* (2013.01); *G06T 2207/20081* (2013.01); *G06T 2207/20084* (2013.01); *G06T 2207/30201* (2013.01)

(58) Field of Classification Search
CPC .... G06V 10/82; G06V 40/171; G06V 40/172; G06V 10/454; G06T 3/4046; G06T 7/11; G06T 2207/20021; G06T 2207/20076; G06T 2207/20081; G06T 2207/20084; G06T 2207/30201
See application file for complete search history.

(56) References Cited

U.S. PATENT DOCUMENTS

| | | | | |
|---|---|---|---|---|
| 2020/0302225 | A1* | 9/2020 | Dutta | G06V 10/7715 |
| 2021/0012576 | A1* | 1/2021 | Riegler | G06N 3/08 |
| 2021/0209837 | A1* | 7/2021 | Chen | G06T 15/506 |
| 2023/0101653 | A1* | 3/2023 | Matsumura | G06V 40/10 382/159 |
| 2023/0245495 | A1* | 8/2023 | Ninh | G06V 40/168 382/118 |
| 2023/0298272 | A1* | 9/2023 | Ezhov | A61C 9/0053 345/423 |
| 2023/0306600 | A1* | 9/2023 | Zhang | G06T 7/11 |
| 2023/0377093 | A1* | 11/2023 | Djelouah | G06T 3/4046 |
| 2023/0410339 | A1* | 12/2023 | Sawarkar | G06N 3/0895 |
| 2024/0029203 | A1* | 1/2024 | Xu | G06T 5/50 |
| 2024/0062365 | A1* | 2/2024 | Shen | G06T 7/11 |
| 2024/0070809 | A1* | 2/2024 | Xu | G06T 3/4053 |
| 2024/0089580 | A1* | 3/2024 | Nomura | G06V 40/10 |
| 2024/0249434 | A1* | 7/2024 | Hong | G06F 16/55 |
| 2024/0265676 | A1* | 8/2024 | Janoušková | G06N 3/045 |
| 2024/0412319 | A1* | 12/2024 | Singh | G06T 3/02 |

OTHER PUBLICATIONS

Chen, Y. "Learning Continuous Image Representation with Local Implicit Image Function" Computer Vision and Pattern Recognition (cs.CV); Machine Learning, pp. 1-11. (Year: 2021).*

Aaron S Jackson, Michel Valstar, and Georgios Tzimiropoulos. A cnn cascade for landmark guided semantic part segmentation. In European Conference on Computer Vision, pp. 143-155. Springer, 2016.

Abdallah Dib, Cédric Thébault, Junghyun Ahn, Philippe-Henri Gosselin, Christian Theobalt, and Louis Chevallier. Towards high fidelity monocular face reconstruction with rich reflectance using self-supervised learning and ray tracing. In Proceedings of the IEEE/CVF International Conference on Computer Vision, pp. 12819-12829, 2021.

Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. 2017.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In International Conference on Machine Learning, pp. 8748-8763. PMLR, 2021.

Alexandros Lattas, Stylianos Moschoglou, Baris Gecer, Stylianos Ploumpis, Vasileios Triantafyllou, Abhijeet Ghosh, and Stefanos Zafeiriou. Avatarme: Realistically renderable 3d facial reconstruction "in-the-wild". In Proceedings of the IEEE/CVF conference on computer vision and pattern recognition, pp. 760-769, 2020.

Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. arXiv preprint arXiv:2010.11929, 2020.

Bee Lim, Sanghyun Son, Heewon Kim, Seungjun Nah, and Kyoung Mu Lee. Enhanced deep residual networks for single image super-resolution. In Proceedings of the IEEE conference on computer vision and pattern recognition workshops, pp. 136-144, 2017.

Ben Mildenhall, Pratul P. Srinivasan, Matthew Tancik, Jonathan T. Barron, Ravi Ramamoorthi, and Ren Ng. Nerf: Representing scenes as neural radiance fields for view synthesis. In ECCV, 2020.

Cheng-Han Lee, Ziwei Liu, Lingyun Wu, and Ping Luo. Maskgan: Towards diverse and interactive facial image manipulation. In IEEE Conference on Computer Vision and Pattern Recognition (CVPR), 2020.

Cheng-Han Lee, Ziwei Liu, Lingyun Wu, and Ping Luo. Maskgan: Towards diverse and interactive facial image manipulation. In Proceedings of the IEEE/CVF Conference on Computer Vision and Pattern Recognition, pp. 5549-5558, 2020.

Diederik P Kingma and Jimmy Ba. Adam: A method for stochastic optimization. arXiv preprint arXiv:1412.6980, 2014.

Dmitry Ulyanov, Andrea Vedaldi, and Victor Lempitsky. Instance normalization: The missing ingredient for fast stylization. arXiv preprint arXiv:1607.08022, 2016.

Eduard Ramon, Gil Triginer, Janna Escur, Albert Pumarola, Jaime Garcia, Xavier Giro-i Nieto, and Francesc Moreno-Noguer. H3d-net: Few-shot high-fidelity 3d head reconstruction. In Proceedings of the IEEE/CVF International Conference on Computer Vision, pp. 5620-5629, 2021.

Eric R Chan, Marco Monteiro, Petr Kellnhofer, Jiajun Wu, and Gordon Wetzstein. pi-gan: Periodic implicit generative adversarial networks for 3d-aware image synthesis. In Proceedings of the IEEE/CVF conference on computer vision and pattern recognition, pp. 5799-5809, 2021.

Frederick Ira Parke. A parametric model for human faces. Technical report, Utah Univ Salt Lake City Dept of Computer Science, 1974.

Gusi Te, Wei Hu, Yinglu Liu, Hailin Shi, and Tao Mei. Agrnet: Adaptive graph representation learning and reasoning for face parsing. IEEE Transactions on Image Processing, 30:8236-8250, 2021.

Gusi Te, Yinglu Liu, Wei Hu, Hailin Shi, and Tao Mei. Edgeaware graph representation learning and reasoning for face parsing. In European Conference on Computer Vision, pp. 258-274. Springer, 2020.

Guy Gafni, Justus Thies, Michael Zollhofer, and Matthias Nießner. Dynamic neural radiance fields for monocular 4d facial avatar reconstruction. In Proceedings of the IEEE/CVF Conference on Computer Vision and Pattern Recognition, pp. 8649-8658, 2021.

He Zhang, Benjamin S Riggan, Shuowen Hu, Nathaniel J Short, and Vishal M Patel. Synthesis of high-quality visible faces from polarimetric thermal faces using generative adversarial networks. International Journal of Computer Vision, 127(6):845-862, 2019.

Huawei Wei, Shuang Liang, and Yichen Wei. 3d dense face alignment via graph convolution networks. arXiv preprint arXiv:1904.05562, 2019.

Ira Kemelmacher-Shlizerman. Transfiguring portraits. 35(4), 2016.

Jeong Joon Park, Peter Florence, Julian Straub, Richard Newcombe, and Steven Lovegrove. Deepsdf: Learning continuous signed distance functions for shape representation. In Proceedings of the IEEE/CVF conference on computer vision and pattern recognition, pp. 165-174, 2019.

Jiaxiang Shang, Tianwei Shen, Shiwei Li, Lei Zhou, Mingmin Zhen, Tian Fang, and Long Quan. Self-supervised monocular 3d face

(56) References Cited

OTHER PUBLICATIONS reconstruction by occlusion-aware multiview geometry consistency. In European Conference on Computer Vision, pp. 53-70. Springer, 2020.

Jinpeng Lin, Hao Yang, Dong Chen, Ming Zeng, Fang Wen, and Lu Yuan. Face parsing with RoI tanh-warping. In Proceedings of the IEEE/CVF Conference on Computer Vision and Pattern Recognition, pp. 5654-5663, 2019.

Jonathan Long, Evan Shelhamer, and Trevor Darrell. Fully convolutional networks for semantic segmentation. In Proceedings of the IEEE conference on computer vision and pattern recognition, pp. 3431-3440, 2015.

Justus Thies, Michael Zollhofer, Marc Stamminger, Christian Theobalt, and Matthias Nießner. Face2face: Real-time face capture and reenactment of rgb videos. In Proceedings of the IEEE conference on computer vision and pattern recognition, pp. 2387-2395, 2016.

Lars Mescheder, Michael Oechsle, Michael Niemeyer, Sebastian Nowozin, and Andreas Geiger. Occupancy networks: Learning 3d reconstruction in function space. In Proceedings of the IEEE/CVF conference on computer vision and pattern recognition, pp. 4460-4470, 2019.

Lior Yariv, Yoni Kasten, Dror Moran, Meirav Galun, Matan Atzmon, Basri Ronen, and Yaron Lipman. Multiview neural surface reconstruction by disentangling geometry and appearance. Advances in Neural Information Processing Systems, 33:2492-2502, 2020.

Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proc. of the IEEE Conference on Computer Vision and Pattern Recognition (CVPR), 2016.

Michael Zollhofer, Justus Thies, Pablo Garrido, Derek Bradley, Thabo Beeler, Patrick Pérez, Marc Stamminger, Matthias Nießner, and Christian Theobalt. State of the art on monocular 3d face reconstruction, tracking, and applications. In Computer graphics forum, vol. 37, pp. 523-550. Wiley Online Library, 2018.

Olga Russakovsky, Jia Deng, Hao Su, Jonathan Krause, Sanjeev Satheesh, Sean Ma, Zhiheng Huang, Andrej Karpathy, Aditya Khosla, Michael Bernstein, Alexander C. Berg, and Li Fei-Fei. ImageNet Large Scale Visual Recognition Challenge. International Journal of Computer Vision (IJCV), 115(3):211-252, 2015.

Petr Kellnhofer, Lars C Jebe, Andrew Jones, Ryan Spicer, Kari Pulli, and Gordon Wetzstein. Neural lumigraph rendering. In Proceedings of the IEEE/CVF Conference on Computer Vision and Pattern Recognition, pp. 4287-4297, 2021.

Ping Luo, Xiaogang Wang, and Xiaoou Tang. Hierarchical face parsing via deep learning. In 2012 IEEE Conference on Computer Vision and Pattern Recognition, pp. 2480-2487, 2012.

Qi Zheng, Jiankang Deng, Zheng Zhu, Ying Li, and Stefanos Zafeiriou. Decoupled multi-task learning with cyclical selfregulation for face parsing. In Computer Vision and Pattern Recognition, 2022.

Sifei Liu, Jianping Shi, Ji Liang, and Ming Hsuan Yang. Face parsing via recurrent propagation. In British Machine Vision Conference 2017, BMVC 2017, British Machine Vision Conference 2017, BMVC 2017. BMVA Press, 2017.

Sifei Liu, Jimei Yang, Chang Huang, and Ming-Hsuan Yang. Multi-objective convolutional learning for face labeling. In Proceedings of the IEEE conference on computer vision and pattern recognition, pp. 3451-3459, 2015.

Stephen Lombardi, Tomas Simon, Jason Saragih, Gabriel Schwartz, Andreas Lehrmann, and Yaser Sheikh. Neural vols. Learning dynamic renderable volumes from images. arXiv preprint arXiv:1906.07751, 2019.

Stylianos Ploumpis, Evangelos Ververas, Eimear O'Sullivan, Stylianos Moschoglou, Haoyang Wang, Nick Pears, William AP Smith, Baris Gecer, and Stefanos Zafeiriou. Towards a complete 3d morphable model of the human head. IEEE transactions on pattern analysis and machine intelligence, 43(11):4142-4160, 2020.

Tarun Yenamandra, Ayush Tewari, Florian Bernard, Hans-Peter Seidel, Mohamed Elgharib, Daniel Cremers, and Christian Theobalt. i3dmm: Deep implicit 3d morphable model of human heads. In Proceedings of the IEEE/CVF Conference on Computer Vision and Pattern Recognition, pp. 12803-12813, 2021.

Thomas Gerig, Andreas Morel-Forster, Clemens Blumer, Bernhard Egger, Marcel Luthi, Sandro Schonborn, and Thomas Vetter. Morphable face models—an open framework. In 2018 13th IEEE International Conference on Automatic Face & Gesture Recognition (FG 2018), pp. 75-82. IEEE, 2018.

Tianchu Guo, Youngsung Kim, Hui Zhang, Deheng Qian, ByungIn Yoo, Jingtao Xu, Dongqing Zou, Jae-Joon Han, and Changkyu Choi. Residual encoder decoder network and adaptive prior for face parsing. In Proceedings of the AAAI Conference on Artificial Intelligence, vol. 32, 2018.

Vincent Sitzmann, Julien N.P. Martel, Alexander W. Bergman, David B. Lindell, and Gordon Wetzstein. Implicit neural representations with periodic activation functions. In Proc. NeurIPS, 2020.

Volker Blanz and Thomas Vetter. A morphable model for the synthesis of 3d faces. In Proceedings of the 26th annual conference on Computer graphics and interactive techniques, pp. 187-194, 1999.

Vuong Le, Jonathan Brandt, Zhe Lin, Lubomir Bourdev, and Thomas S Huang. Interactive facial feature localization. In ECCV. Springer, 2012.

Xiangtai Li, Ansheng You, Zhen Zhu, Houlong Zhao, Maoke Yang, Kuiyuan Yang, and Yunhai Tong. Semantic flow for fast and accurate scene parsing. In ECCV, 2020.

Xiaoguang Tu, Jian Zhao, Zihang Jiang, Yao Luo, Mei Xie, Yang Zhao, Linxiao He, Zheng Ma, and Jiashi Feng. Joint 3d face reconstruction and dense face alignment from a single image with 2d- assisted self-supervised learning. arXiv preprint arXiv:1903.09359, 1(2), 2019.

Xinyu Ou, Si Liu, Xiaochun Cao, and Hefei Ling. Beauty emakeup: A deep makeup transfer system. In Proceedings of the 24th ACM International Conference on Multimedia, p. 701-702, New York, NY, USA, 2016. Association for Computing Machinery.

Yao Feng, Fan Wu, Xiaohu Shao, Yanfeng Wang, and Xi Zhou. Joint 3d face reconstruction and dense alignment with position map regression network. In Proceedings of the European conference on computer vision (ECCV), pp. 534-551, 2018.

Yao Feng, Haiwen Feng, Michael J Black, and Timo Bolkart. Learning an animatable detailed 3d face model from in-the-wild images. ACM Transactions on Graphics (ToG), 40(4):1-13, 2021.

Yijun Li, Sifei Liu, Jimei Yang, and Ming-Hsuan Yang. Generative face completion. In Proceedings of the IEEE conference on computer vision and pattern recognition, pp. 3911-3919, 2017.

Yiming Lin, Jie Shen, Yujiang Wang, and Maja Pantic. Roi tanhpolar transformer network for face parsing in the wild, 2021.

Yinbo Chen, Sifei Liu, and Xiaolong Wang. Learning continuous image representation with local implicit image function. In Proceedings of the IEEE/CVF conference on computer vision and pattern recognition, pp. 8628-8638, 2021.

Yinglin Zheng, Hao Yang, Ting Zhang, Jianmin Bao, Dongdong Chen, Yangyu Huang, Lu Yuan, Dong Chen, Ming Zeng, and Fang Wen. General facial representation learning in a visual-linguistic manner. In Proceedings of the IEEE/CVF Conference on Computer Vision and Pattern Recognition, pp. 18697-18709, 2022.

Yinglu Liu, Hailin Shi, Hao Shen, Yue Si, Xiaobo Wang, and Tao Mei. A new dataset and boundary—attention semantic segmentation for face parsing. In AAAI, pp. 11637-11644, 2020.

Yisu Zhou, Xiaolin Hu, and Bo Zhang. Interlinked convolutional neural networks for face parsing. In Advances in Neural Networks—ISNN 2015, pp. 222-231. Springer International Publishing, 2015.

Yu Deng, Jiaolong Yang, Sicheng Xu, Dong Chen, Yunde Jia, and Xin Tong. Accurate 3d face reconstruction with weakly-supervised learning: From single image to image set. In Proceedings of the IEEE/CVF Conference on Computer Vision and Pattern Recognition Workshops, 2019.

Yuval Nirkin, Iacopo Masi, Anh Tran Tuan, Tal Hassner, and Gerard Medioni. On face segmentation, face swapping, and face perception. In 2018 13th IEEE International Conference on Automatic Face & Gesture Recognition (FG 2018), pp. 98-105. IEEE, 2018.

(56) References Cited

OTHER PUBLICATIONS

Yuval Nirkin, Yosi Keller, and Tal Hassner. Fsgan: Subject agnostic face swapping and reenactment. In Proceedings of the IEEE/CVF international conference on computer vision, pp. 7184-7193, 2019.
Z. Shu, E. Yumer, S. Hadap, K. Sunkavalli, E. Shechtman, and D. Samaras. Neural face editing with intrinsic image disentangling. In Computer Vision and Pattern Recognition, 2017. CVPR 2017. IEEE Conference on. IEEE, 2017.
Zhen Wei, Si Liu, Yao Sun, and Hefei Ling. Accurate facial image parsing at real-time speed. IEEE Transactions on Image Processing, 28(9):4659-4670, 2019.
Zhiqin Chen and Hao Zhang. Learning implicit fields for generative shape modeling. In Proceedings of the IEEE/CVF Conference on Computer Vision and Pattern Recognition, pp. 5939-5948, 2019.

\* cited by examiner

UTILIZING IMPLICIT NEURAL REPRESENTATIONS TO PARSE VISUAL COMPONENTS OF SUBJECTS DEPICTED WITHIN VISUAL CONTENT

BACKGROUND

Recent years have seen an increase in the creation and modification of digital content. For example, individuals and businesses increasingly utilize computing devices to create, capture, upload, modify, and analyze digital content, such as digital images and digital videos. In many cases, digital content designers utilize digital content programs to visualize digital content, segment features in digital content, and modify digital content. For instance, many conventional systems perform face parsing on digital content by assigning pixel-wise labels to images depicting faces to distinguish various parts of a face, such as eyes, nose, lips, ears, etc. (e.g., for face image editing, face e-beautification, face swapping, face completion). To perform face parsing, many conventional systems utilize semantic segmentation through the use of various machine learning approaches, such as deep convolutional networks, transformer models, multi-task learning, graph convolutional networks, and cyclic learning. Although many of these conventional systems utilize semantic segmentation, such systems have a number of shortcomings, particularly with regards to efficiently and flexibly detecting accurate semantic regions within digital content.

SUMMARY

This disclosure describes one or more implementations of systems, non-transitory computer-readable media, and methods that solve one or more of the foregoing problems by utilizing a local implicit image function neural network to perform digital image segmentation (e.g., human face semantic segmentation) with a continuous class label probability distribution. In one or more embodiments, the disclosed systems utilize a local implicit image function (LIIF) network to learn a mapping from an image to its label space or segmentation domain. In particular, in one or more instances, the disclosed systems utilize an image encoder to generate an image vector representation from an image (e.g., an image depicting a face). Subsequently, in one or more implementations, the disclosed systems utilize the image vector representation with a LIIF network decoder that generates a continuous probability distribution in a label space (e.g., a label space for facial features) for the image (e.g., for utilization in creating a semantic segmentation mask having various labelled semantic regions for the image). Moreover, in one or more embodiments, the disclosed systems utilize the LIIF-based segmentation network to generate segmentation masks at different resolutions without changes in an input resolution of the segmentation network.

BRIEF DESCRIPTION OF THE DRAWINGS

The detailed description is described with reference to the accompanying drawings in which.

DETAILED DESCRIPTION

Figure 1:
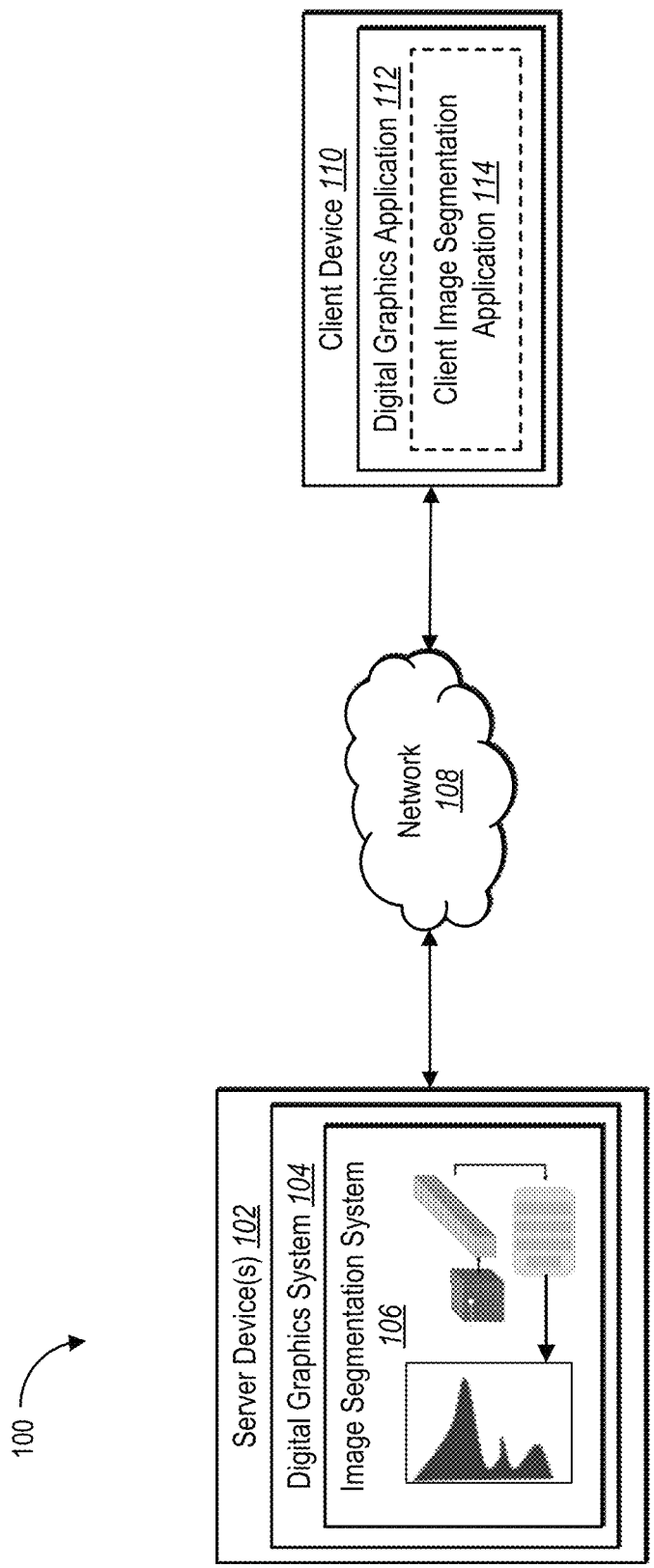
FIG. 1 illustrates a schematic diagram of an example environment in which an image segmentation system operates in accordance with one or more implementations.

This disclosure describes one or more implementations of an image segmentation system that utilize a local implicit image function neural network to perform image segmentation (e.g., human face semantic segmentation or face parsing) with a continuous class label probability distribution. For instance, in one or more implementations, the image segmentation system utilizes an image encoder to generate an image vector representation from an image and utilizes the image vector representation with a LIIF network decoder to generate a continuous probability distribution in a class label space for the image that indicates class labels for various semantic features within the image. In one or more instances, the image segmentation system utilizes the continuous probability distribution to generate a semantic segmentation mask for the image that indicates labeled semantic regions using the continuous probability distribution for the class labels.

In one or more embodiments, the image segmentation system analyzes an image (e.g., an image depicting a subject, such as a human face) utilizing an image encoder to generate an image vector representation for the image. For instance, the image segmentation system generates the image vector representation as a volume of latent vectors. In one or more implementations, the image segmentation system utilizes a convolutional image encoder that includes residual blocks with instance normalization blocks after convolution layers and, also, strided convolution layers between various groups of residual blocks.

Upon generating the image vector representation for the image, in one or more embodiments the image segmentation system utilizes a LIIF network decoder with the image vector representation to generate a continuous probability distribution in a label space for the image that indicates class labels for various semantic features within the image. In one or more cases, the image segmentation system utilizes the LIIF network decoder with the image vector representation to learn a continuous representation for segmentation for the image. Additionally, in one or more implementations, the image segmentation system utilizes a LIIF network decoder with a reduced channel image vector representation generated by using multilayer perceptrons (MLP) on an unfolded image vector representation (for a local context) and a global pool feature vector generated using global pooling on the image vector (for a global context).

Indeed, in one or more embodiments, the image segmentation system utilizes the image encoder and the LIIF network decoder to generate a continuous class label probability distribution. In one or more instances, the image segmentation system generates a continuous class label probability distribution that creates a continuous representation function across pixels that interpolates class label predictions in between pixels (e.g., fractional pixels). Indeed, in one or more embodiments, the image segmentation system utilizes the continuous class label probability distribution to create a semantic segmentation mask for an image that represents labeled semantic regions within the image (e.g., one or more separate semantic features in the image). Furthermore, in one or more cases, the image segmentation system the continuous class label probability distribution (from the LIIF network decoder) to upscale (or upsample) a semantic segmentation mask to a higher resolution by utilizing upsampled coordinates to retrieve, from the continuous class label probability distribution, class label predictions at coordinates that are in between pixels.

In some implementations, the image segmentation system utilizes the LIIF network segmentation model for face parsing tasks. In particular, the image segmentation system generates an image vector representation from an image depicting a human face. Then, in one or more embodiments, the image segmentation system utilizes a LIIF network decoder to generate a continuous class label probability distribution for facial feature labels (e.g., an eye label, a nose label, a lips label, a skin label, an eyebrows label, a teeth label, a hair label). Indeed, in one or more implementations, the image segmentation system utilizes the continuous class label probability distribution for facial feature labels to create a semantic segmentation mask for the image having labeled facial feature regions based on the continuous class label probability distribution.

As mentioned above, many conventional systems suffer from a number of technical deficiencies. For instance, conventional systems are unable to efficiently and flexibly perform accurate semantic segmentation on images. For instance, some conventional systems utilize localized methods that focus on facial components during semantic segmentation, however such conventional systems are inefficient in terms of parameter sharing. In many cases, such conventional systems and various other conventional systems (that employ various approaches, such as deep convolutional networks, transformer models, multi-task learning, graph convolutional networks, and cyclic learning) utilize a large number of parameters and are computationally expensive to train and utilize.

In addition, many conventional systems rigidly aim to model spatial dependencies existing in pixels of an image. Oftentimes, conventional systems provide per pixel predictions or predict a single mask segmenting components simultaneously (e.g., using various approaches, such as deep convolutional networks, transformer models, multi-task learning, graph convolutional networks, and cyclic learning). In one or more instances, such conventional systems are unable to scale resolution of segmentation masks. Indeed, oftentimes, such conventional systems train separate models to handle separate image resolutions to generate segmentation masks for separate image resolutions.

The image segmentation system provides a number of advantages relative to these conventional systems. For instance, in contrast to many conventional systems, the image segmentation system is able to achieve state of the art accuracy with a lightweight and faster segmentation model. In one or more instances, the image segmentation system utilizes a low-parameter image encoder and a LIIF network decoder that utilizes a reduced channel image vector representation (as a segmentation model) to achieve segmentation results that match and surpass many conventional systems. In particular, as described in the experiments section below, the image segmentation system utilizes a LIIF network-based segmentation model that performs semantic labeling tasks on various image datasets better than many conventional systems.

While matching or surpassing the accuracy of semantic segmentation tasks on various image datasets, the image segmentation system is also lighter and faster than many conventional systems (that employ various approaches, such as deep convolutional networks, transformer models, multi-task learning, graph convolutional networks, and cyclic learning). For example, the image segmentation model utilizes a low-parameter image encoder and a LIIF network decoder that utilizes a reduced channel image vector representation that establishes the above-mentioned segmentation accuracy with a parameter count of $1/26^{th}$ or lesser compared to many conventional systems. Additionally, the image segmentation model also utilizes a low-parameter image encoder and a LIIF network decoder that utilizes a reduced channel image vector representation to establish the above-mentioned segmentation accuracy while achieving a higher frame per second (FPS) (e.g., 110 or more) compared to various conventional systems.

In addition to the efficiency and accuracy, the image segmentation system is also flexible and scalable. Unlike many conventional systems that are unable to scale resolution of segmentation masks, the image segmentation system is able to easily scale semantic segmentation for different input image sizes. To illustrate, in one or more embodiments, the image segmentation system utilizes the LIIF network decoder to generate continuous representation function across pixels that interpolates class label predictions both in between pixels and on pixels. By generating a continuous representation function across pixels, in many cases, the image segmentation system is able to upscale (or upsample) an accurate semantic segmentation mask to a higher resolution by utilizing upsampled coordinates to retrieve, from the continuous class label probability distribution, class label predictions at coordinates that are in between pixels. Accordingly, in one or more instances, the image segmentation system generates segmentation at different resolutions without a change in an input resolution for the LIIF network-based segmentation mode.

To illustrate, in one or more embodiments, the image segmentation system utilizes a single LIIF network-based segmentation model for various image resolution inputs by matching the image resolution to the input resolution of the model and accurately upsampling the output segmentation masks to the original image resolution. Furthermore, in many instances, the image segmentation system also utilizes downsampling of images to lower the inference cost by performing a low-resolution prediction using the continuous class label probability distribution from the LIIF network-based segmentation model and accurately upscaling the output segmentation mask (e.g., to achieve high FPS counts as described in the experiments section below).

Furthermore, in one or more embodiments, the image segmentation system achieves the improved efficiency, scalability, and accuracy in image segmentation while reducing training complexity. More specifically, many conventional systems (that employ various approaches, such as deep convolutional networks, transformer models, multi-task learning, graph convolutional networks, and cyclic learning) use a large number of parameters with a substantial number of training losses. In contrast to such conventional systems, the image segmentation system, in many implementations, achieves the improved efficiency, scalability, and accuracy in image segmentation while training the LIIF network-based segmentation model using a cross-entropy loss and an edge-aware loss.

Turning now to the figures, FIG. 1 illustrates a schematic diagram of one or more implementations of a system 100 (or environment) in which an image segmentation system operates in accordance with one or more implementations. As illustrated in FIG. 1, the system 100 includes a server device(s) 102, a network 108, and a client device 110. As further illustrated in FIG. 1, the server device(s) 102 and the client device 110 communicate via the network 108.

In one or more implementations, the server device(s) 102 includes, but is not limited to, a computing (or computer) device (as explained below with reference to FIG. 11). As shown in FIG. 1, the server device(s) 102 include a digital graphics system 104 which further includes the image segmentation system 106. The digital graphics system 104 create, display, modify, capture, and/or render various digital content items (e.g., digital images, digital videos, three-dimensional objects, two-dimensional objects). In some instances, the digital graphics system 104 modifies digital content items utilizing various tools, such as, but not limited to, visual characteristic modifications (e.g., hue, exposure, saturation, contrast), pixel and/or image modification (e.g., cloning, deletion, content filling, subject transfers, subject swapping), mask creation (e.g., via machine learning and/or manual selection segmentation tasks).

Moreover, as explained below, the image segmentation system 106, in one or more embodiments, utilizes a local implicit image function network to perform image segmentation (e.g., human face semantic segmentation) with a continuous class label probability distribution. In some implementations, the image segmentation system 106 utilizes an image encoder to generate an image vector representation from an image and utilizes the image vector representation with a LIIF network decoder to generate a continuous probability distribution in a label space for the image that indicates class labels for various semantic features within the image. Subsequently, the image segmentation system 106 utilizes the continuous probability distribution to generate a semantic segmentation mask for the image that indicates labeled semantic regions using the continuous probability distribution for the class labels.

Furthermore, as shown in FIG. 1, the system 100 includes the client device 110. In one or more implementations, the client device 110 includes, but is not limited to, a mobile device (e.g., smartphone, tablet), a laptop, a desktop, or any other type of computing device, including those explained below with reference to FIG. 11. In certain implementations, although not shown in FIG. 1, the client device 110 is operated by a user to perform a variety of functions (e.g., via the digital graphics application 112). For example, the client device 110 performs functions such as, but not limited to, creating, displaying, modifying, capturing, and/or rendering various digital content items (e.g., digital images, digital videos, three-dimensional objects, two-dimensional objects).

To access the functionalities of the image segmentation system 106 (as described above), in one or more implementations, a user interacts with the digital graphics application 112 on the client device 110. For example, the digital graphics application 112 includes one or more software applications installed on the client device 110 (e.g., to create segmentation masks for digital content items and/or to modify digital content items via segmentation masks in accordance with one or more implementations herein). In some cases, the digital graphics application 112 is hosted on the server device(s) 102. In addition, when hosted on the server device(s) 102, the digital graphics application 112 is accessed by the client device 110 through a web browser and/or another online interfacing platform and/or tool.

Although FIG. 1 illustrates the image segmentation system 106 being implemented by a particular component and/or device within the system 100 (e.g., the server device(s) 102), in some implementations, the image segmentation system 106 is implemented, in whole or in part, by other computing devices and/or components in the system 100. For example, in some implementations, the image segmentation system 106 is implemented on the client device 110 within the digital graphics application 112 (e.g., via a client image segmentation application 114). Indeed, in one or more implementations, the description of (and acts performed by) the image segmentation system 106 are implemented (or performed by) the client image segmentation application 114 when the client device 110 implements the image segmentation system 106. More specifically, in some instances, the client device 110 (via an implementation of the image segmentation system 106 on the client image segmentation application 114) utilizes a local implicit image function network to perform image segmentation (e.g., human face semantic segmentation) with a continuous class label probability distribution (to create a segmentation mask) in accordance with one or more implementations herein.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 11. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2:
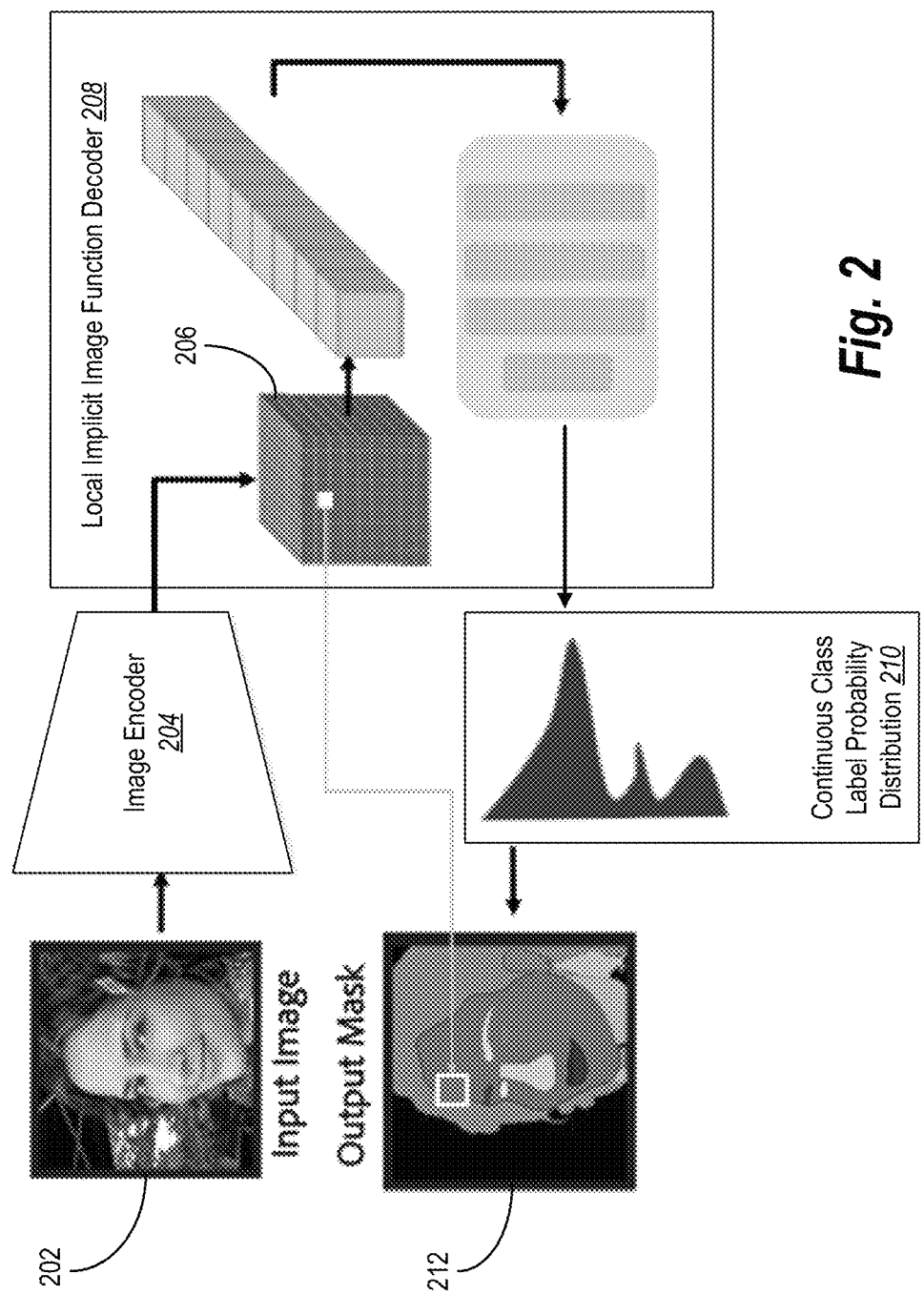
FIG. 2 illustrates an exemplary flow of an image segmentation system creating a semantic segmentation mask utilizing a LIIF network-based segmentation model in accordance with one or more implementations.

As mentioned above, in one or more embodiments, the image segmentation system 106 utilizes a local implicit image function network to perform image segmentation (e.g., human face semantic segmentation) with a continuous class label probability distribution. For instance, FIG. 2 illustrates an exemplary flow of the image segmentation system 106 creating a semantic segmentation mask utilizing a continuous class label probability distribution generated using a LIIF network-based segmentation model. Furthermore, FIG. 3 illustrates the image segmentation system 106 utilizing query coordinates (e.g., coordinates in between pixels) to generate semantic label predictions at the query coordinates utilizing the continuous class label probability distribution (e.g., for upsampling a resolution of a semantic segmentation mask).

Figure 3:
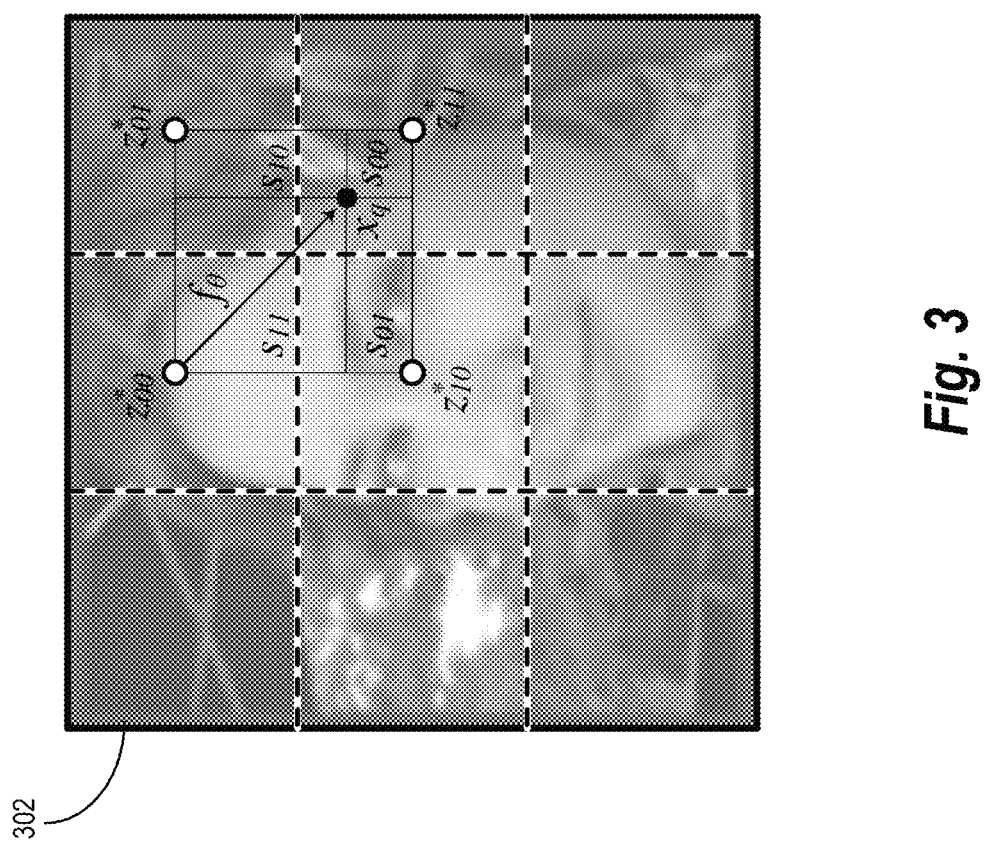
FIG. 3 illustrates an image segmentation system utilizing query coordinates to generate semantic label predictions at the query coordinates utilizing the continuous class label probability distribution in accordance with one or more implementations.

Indeed, in reference to FIGS. 2 and 3, the image segmentation system 106 utilizes a LIIF network to learn a continuous representation for segmentation for subjects depicted within an input image. In particular, in one or more embodiments, the image segmentation system 106 represents an image I in an LIIF network by a two-dimensional (2D) grid of features $Z \in \mathbb{R}^{H \times W \times D}$ such that a function $f_\theta$ can map each $z \in \mathbb{R}^D$ in Z to another domain. In one or more cases, $f$ is a multilayer perceptron (MLP), and $\theta$ are the MLP's parameters. Indeed, in one or more implementations, the image segmentation system 106 represents mappings of coordinates to class label probability distributions in accordance with the following function:

$$s = f_\theta(z, x) \quad (1)$$

In the above-mentioned function (1), in one or more embodiments, the image segmentation system 106 utilizes x as a 2D coordinate ($x \in X$) and s as the signal in the domain into which the image I is converted.

Furthermore, in one or more embodiments, the image segmentation system 106 normalizes the coordinates in a range for each spatial dimension (e.g., $[-1,1]$). Additionally, in one or more implementations, the image segmentation system 106 represents s (from function (1)) as a probability distribution among a set of class labels y in accordance with the following function:

$$P(y|I, x) \quad (2)$$

In the above-mentioned function (2), in one or more embodiments, the image segmentation system 106, for a given image I, with latent codes z and query coordinate $x_q$, utilizes an output (e.g., a continuous class label probability distribution) in accordance with the following function:

$$P(y|x_q) = f_\theta(z, x_q) \quad (3)$$

In addition, in one or more embodiments, utilizing an LIIF network approach, the image segmentation system 106 represents an output (e.g., a continuous class label probability distribution) in accordance with the following function:

$$P(y|x_q) = f_\theta(z^*, x_q - v^*) \quad (4)$$

Moreover, in one or more implementations, the image segmentation system 106 utilizes $z^*$ as the nearest z to the query coordinate $x_q$ and $v^*$ is the nearest latent vector coordinate (in the function (4)).

To illustrate, as shown in FIG. 2, the image segmentation system 106 utilizes an image encoder 204 with an input image 202 (e.g., the image I) to generate an image vector representation 206 (e.g., features Z). Furthermore, as shown in FIG. 2, the image segmentation system 106 utilizes the image vector representation 206 with a local implicit image function decoder 208 (e.g., function $f_\theta$) to generate a continuous class label probability distribution 210 (e.g., class label probability distribution s or P (y|I, x)). Subsequently, as shown in the FIG. 2, the image segmentation system 106 utilizes the continuous class label probability distribution 210 to create an output semantic segmentation mask 212 (for the input image 202) that includes labeled semantic regions (e.g., facial feature regions) predicted for the input image 202.

In one or more embodiments, an image (sometimes referred to as a digital image) includes a digital symbol, picture, icon, and/or other visual illustration depicting one or more subjects. For instance, an image includes a digital file having a visual illustration and/or depiction of a subject (e.g., human, place, or thing). Indeed, in some implementations, an image includes, but is not limited to, a digital file with the following extensions: JPEG, TIFF, BMP, PNG, RAW, or PDF. In some instances, an image includes a frame from a digital video file having an extension such as, but not limited to the following extensions: MP4, MOV, WMV, or AVI.

As further shown in FIG. 2, the image segmentation system 106 utilizes an image encoder 204 with the input image 202 to generate an image vector representation 206. In one or more embodiments, an image encoder includes a machine learning model (or neural network) that encodes features of an image into an image vector representation (as latent code representations). In some cases, the image segmentation system 106 utilizes a convolutional image encoder that encodes features depicted within an image into a latent feature space (e.g., having latent code representations) to generate the image vector representation.

In some instances, the image segmentation system 106 utilizes a deep residual network (for image super resolution) as an image encoder to generate an image vector representation from an image. For example, in some embodiments, the image segmentation system 106 utilizes a deep residual network as described in Bee Lim et al., *Enhanced Deep Residual Networks for Single Image Super-Resolution*, Proceedings of the IEEE Conference on Computer Vision and Pattern Recognition Workshops (2017) (hereinafter Bee Lim) with modified residual blocks (e.g., with appended instance normalization blocks and strided convolution layers) as described below (e.g., in reference to FIG. 4).

Furthermore, in one or more embodiments, an image vector representation includes a representation of one or more features depicted within an image in a latent space. Indeed, in one or more instances, an image vector representation includes a collection of data that represents one or more features depicted within an image in an abstract (multi-dimensional) space. In some embodiments, the image segmentation system 106 utilizes an image vector representation with an LIIF decoder to interpret (or map) features represented in the image vector representation into predicted semantic class labels (e.g., labels representing various visual features or objects).

As also shown in FIG. 2, the image segmentation system 106 utilizes a local implicit image function decoder 208. In some instances, a local implicit image function decoder includes a local implicit image function network that parameterizes signals as continuous functions. Indeed, in one or more embodiments, the image segmentation system 106 utilizes a local implicit image function network (LIIF network) that treats images in a continuous domain to generate a continuous function that determines class label probabilities at various coordinates of an image. For example, in some cases, the image segmentation system 106 utilizes an implicit neural representation-based super-resolution model as described in Yinbo Chen et al., *Learning Continuous Image Representation with Local Implicit Image Function*, Proceedings of the IEEE/CVF Conference on Computer Vision and Pattern Recognition (2021) (hereinafter Chen) to generate continuous class label probability distributions from image vector representations as described below (e.g., in reference to FIG. 5).

In one or more embodiments, an image encoder and/or a local implicit image function network includes a machine learning model that utilizes supervised and/or unsupervised learning to evaluate relationships represented within a claim relation graph to determine class labels (or continuous class label probability distributions) for images. Furthermore, in some instances, a machine learning model utilizes supervised and/or unsupervised learning to represent features depicted in an image within a latent space and/or predict class labels (or continuous class label probability distributions) for images. In one or more instances, a neural network refers to a machine-learning model that is trained and/or tuned based on inputs to determine classifications or approximate unknown functions. For example, a neural network includes a model of interconnected artificial neurons (e.g., organized in layers) that communicate and learn to approximate complex functions and generate outputs (e.g., feature vectors, class label predictions) based on a plurality of inputs (e.g., images) provided to the neural network. In some cases, a neural network refers to an algorithm (or set of algorithms) that implements deep learning techniques to model high-level abstractions in data. For example, a neural network includes a convolutional neural network (CNN), a recurrent neural network (RNN), a residual network, and/or a LIIF network.

In one or more embodiments, a continuous class label probability distribution includes a function that provides a probability of a semantic class label (from one or more class labels) belonging to a particular location (e.g., coordinate) within an image. In some cases, the continuous class label probability distribution includes function that provides probabilities (or likelihood scores) for one or more semantic class labels at a particular location within an image. Furthermore, in some cases, a semantic class label includes a descriptor that represents a particular visual category (e.g., a facial feature or part, such as eyes, nose, lips, visual components of an object, such as, parts of a plant and/or cell). In some cases, semantic class labels include facial feature labels that represents descriptions for particular visual features of a human face (e.g., an eye label, a nose label, a teeth label, a lip label, a hair label, a skin label, an eyebrows label).

Furthermore, as shown in FIG. 2, the image segmentation system 106 utilizes a continuous class label probability distribution 210 to generate the semantic segmentation mask 212. In one or more instances, a semantic segmentation mask includes a digital graphics item reflecting selected pixels (e.g., pixels representing different class labels) in a digital image. In particular, in one or more embodiments, a semantic segmentation mask includes boundary, matrix, array, index, digital file, or other set of pixels that reflect various semantic features (or semantic class labels) portrayed in a digital image. For example, a semantic segmentation mask includes one or more labeled semantic regions for a digital image. In particular, the image segmentation system 106 generates a semantic segmentation mask that indicates various labeled semantic regions utilizing varying pixel values within a mask image layer (or indicates various labeled semantic regions utilizing varying class labels at varying coordinates within a matrix and/or array corresponding to a digital image).

Indeed, in one or more cases, labeled semantic regions indicate various predicted class labels at various coordinates of a digital image to classify or represent various features of a subject. Furthermore, in some instances, labeled semantic regions include labeled facial feature regions. In particular, in one or more embodiments (and as shown in FIG. 2), labeled facial feature regions indicate various predicted facial feature labels at various coordinates of a digital image to classify or represent various facial features (e.g., eyes, noses, teeth, lips, hair, skin, eyebrows) of a human face depicted within a digital image.

Furthermore, FIG. 3 illustrates the image segmentation system 106 utilizing the continuous representation for segmentation to generate a semantic segmentation label at coordinates between pixels (for an image 302). As shown in FIG. 3, the image segmentation system 106 utilizes a continuous class label probability distribution from the local implicit image function decoder (e.g., function $f_\theta$) to generate continuous semantic class label predictions at coordinate $x_q$. In some instances, as shown in FIG. 3, the image segmentation system 106 utilizes the continuous class label probability distribution from the local implicit image function decoder (e.g., function $f_\theta$) to generate a semantic class label prediction for the coordinate $x_q$ using the latent codes z*and signals s (e.g., using the nearest latent code z* as described in function (4)).

In some cases, the image segmentation system 106 utilizes the continuous representation for segmentation (as described in FIGS. 2 and 3) to create upsampled semantic segmentation masks. In particular, in one or more embodiments, the image segmentation system 106 increases a resolution of (or generates a higher resolution version of) a semantic segmentation mask. For example, the image segmentation system 106 increases a resolution of the semantic segmentation mask to match an image resolution of an image corresponding to the input image.

For instance, in some cases, the image segmentation system 106 downsamples a resolution of an image to match an input resolution for the image segmentation LIIF network (e.g., the encoder and decoder described herein). Furthermore, upon generating a continuous class label probability distribution for the input downsampled image, in one or more embodiments, the creates a semantic segmentation mask for the downsampled image (in accordance with one or more implementations herein). Additionally, in one or more cases, the image segmentation system 106 utilizes the continuous class label probability distribution to create an upsampled semantic segmentation mask for the original image resolution.

In some instances, the image segmentation system 106 generates a high resolution (e.g., higher resolution than an input image) semantic segmentation mask. For example, the image segmentation system 106 utilizes a continuous class label probability distribution to create (or generate) predicted class labels in between pixels of an image to increase the resolution of the image (and increase the resolution of the semantic segmentation mask. Indeed, in one or more embodiments, the image segmentation system 106 utilizes coordinates within an image that is increased in resolution (e.g., using a super resolution model) with the continuous class label probability distribution to generate semantic class label predictions for the coordinates in the increased resolution image.

In some implementations, the image segmentation system 106 utilizes the continuous function (e.g., via the continuous class label probability distribution) to generate class label predictions for various coordinates (and/or upsample coordinates) of an image. For example, the image segmentation system 106 selects a coordinate (and/or upsample coordinate) and utilizes the coordinate (and/or upsample coordinate) with the continuous function (generated in accordance with one or more implementations herein) to receive an output class label probability for the coordinate (and/or upsample coordinate). Then, in one or more embodiments, the image segmentation system 106 utilizes the output class label probability to determine a class label for the corresponding location in the image (based on the coordinate) and/or to create a labeled semantic region for a semantic segmentation mask for the coordinate.

In some cases, the image segmentation system 106 utilizes local ensemble to address discontinuities in the continuous function (e.g., the function $f_\theta$ as described in function (1)) along boundaries of features in an image. For example, in one or more implementations, the image segmentation system 106 calculates an average of the continuous function $f_\theta$ (as described in function (1)) for pixels according to four nearest neighbors of a corresponding latent code $z^*$ (as described in function (4)). In some embodiments, the image segmentation system 106 utilizes local ensemble to bake in a voting mechanism in the LIIF network-based segmentation model at a per-pixel level.

Although one or more embodiments herein illustrate the image segmentation system 106 utilizing an image segmentation LIIF network to create a semantic segmentation mask for images depicting human faces, the image segmentation system 106, in one or more implementations, utilizes the image segmentation LIIF network to create semantic segmentation masks for various subjects. For example, the image segmentation system 106 utilizes the image segmentation LIIF network to create a semantic segmentation mask for various subjects depicted in images. Indeed, in one or more implementations, a subject includes various object depicted within an image. For instance, a subject includes a human (e.g., a human face), place, or a thing. For example, a subject includes, but is not limited to, human faces, animal faces, humans, animals, plants, buildings, cityscapes, cars, cell organisms, and/or signs. In some cases, the image segmentation system 106 utilizes an image segmentation LIIF network to create a semantic segmentation mask to indicate labeled semantic regions for various components and/or attributes of various subjects, such as, but not limited to, cell organisms (e.g., nucleus, cell walls), buildings (e.g., doors, windows, roofs), and/or cars (e.g., wheels, doors, headlights, windows).

Additionally, in one or more embodiments, the image segmentation system 106 utilizes created semantic segmentation masks (generated in accordance with one or more implementations herein) to enable various image editing tasks. For instance, the image segmentation system 106 enables editing tasks to modify image attributes in an image for specific masked regions (e.g., labeled semantic regions) in the semantic segmentation mask, such as, but not limited to, hue, saturation, exposure, and/or contrast. In some cases, the image segmentation system 106 enables editing tasks to remove, add, and/or transfer portions of an image (or objects depicted in the image) for specific masked regions (e.g., labeled semantic regions) in the semantic segmentation mask, such as, but not limited to hairstyle transfers, face swaps, introduce other depictions of objects within an image (e.g., sunglasses, hats).

Figure 4:
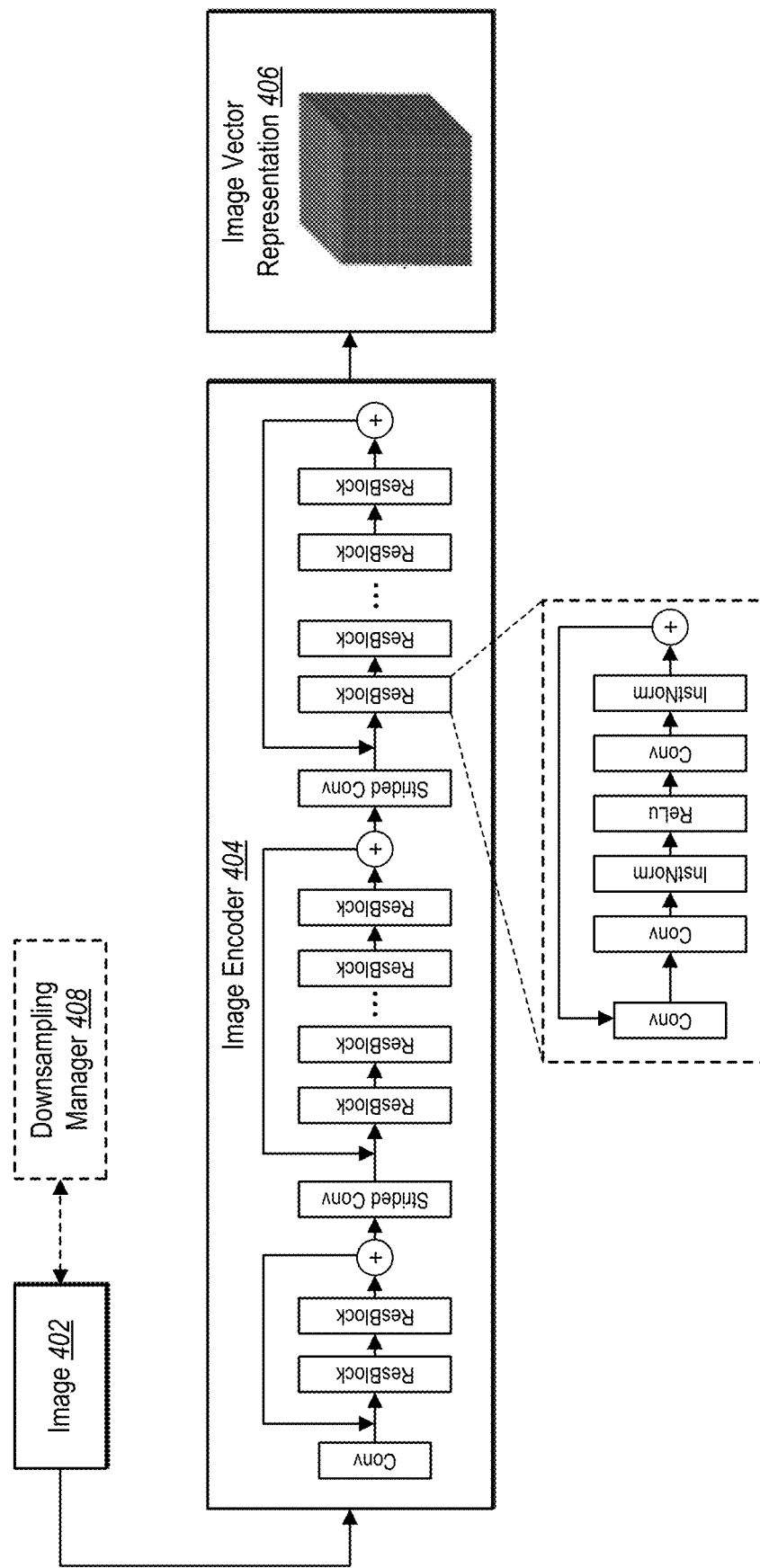
FIG. 4 illustrates an image segmentation system utilizing an image encoder to generate an image vector representation for an image in accordance with one or more implementations.

As mentioned above, the image segmentation system 106 generates an image vector representation for an image using an image encoder. For example, FIG. 4 illustrates the image segmentation system 106 utilizing an image encoder to generate an image vector representation for an image. As shown in FIG. 4, the image segmentation system 106 utilizes (or inputs) an image 402 into an image encoder 404 to generate the image vector representation 406. For instance, the image segmentation system 106 generates the image vector representation 406 (as an image vector representation Z as described above). In some cases, as shown in FIG. 4, the image segmentation system 106 utilizes a downsampling manager 408 to change (e.g., reduce and/or increase) a resolution of an input image (as described above).

As further shown in FIG. 4, the image encoder 404 (e.g., a convolutional image encoder) includes strided convolution layers between groups of residual blocks (e.g., resblocks) and further includes instance normalization layers within residual blocks. For example, as shown in FIG. 4, the image encoder 404 (a convolutional image encoder) includes groups of residual blocks with strided convolution layers between the groups of residual blocks. In one or more embodiments, the image segmentation system 106 utilizes strided convolution layers between groups of residual blocks to reduce spatial dimensions of activation maps (for the input image 402). In addition, as shown in FIG. 4, the image segmentation system 106 utilizes instance normalization after convolution layers within the residual blocks (e.g., within one or more residual blocks of the image encoder 404). Although one or more embodiments illustrate the image segmentation system 106 utilizing a particular combination of residual blocks, network connections, and network layers for an image encoder, in one or more embodiments, the image segmentation system 106 utilizes various combinations of various residual blocks, various network connections, and various network layers for the image encoder. In some instances, the image segmentation system 106 utilizes batch normalization within the residual blocks.

To illustrate, in one or more embodiments, the image segmentation system 106 utilizes an image of size 256×256 as input into an image encoder (as described herein) and generates an output volume of latent vectors (e.g., an image vector representation) of size 64×64. In one or more embodiments, the image segmentation system 106 utilizes an image encoder (as described above) with 24 resblocks and with convolution layers of size 3×3 and a filter depth of 64 channels. Indeed (as shown in FIG. 4), in one or more instances, the image segmentation system 106 passes an input image through a convolution layer before passing the input image into various resblock groups.

In addition, in one or more embodiments, the image segmentation system 106 utilizes an image encoder having three resblock groups (e.g., with instance normalization as describe above). In one or more implementations, the image segmentation system 106 utilizes the first two resblock groups in the image encoder to extract and preserve fine-grained information from an input image while an activation volume undergoes a reduction in spatial dimensions through the strided convolution layers. Additionally, in one or more embodiments, the image segmentation system 106 utilizes a subsequent third group of resblocks in the image encoder to generate an image vector representation (e.g., an image vector representation Z).

In one or more embodiments (and in reference to FIG. 4), the image segmentation system 106 utilizes an image encoder having resblock groups as a series of resblocks followed by a residual connection from the input. In addition, in one or more implementations, the image segmentation system 106 utilizes the image encoder to generate an output, from the first resblock group having two resblocks) and pass the output to a 3×3 convolution with a stride of 2. Moreover, in one or more implementations, the image segmentation system 106 passes the output of the first resblock group and strided convolution to a second resblock-group having six resblocks followed by a convolution of stride 2 (to generate a second downsampled output). Additionally, in one or more embodiments, the image segmentation system 106 passes the second downsampled output through a third resblock group having 16 resblocks to generate a feature volume of size 64×64×64 (e.g., an image vector representation) for a LIIF network-based decoder (as described herein).

Although one or more embodiments herein describe the image segmentation system 106 utilizing a specific number of resblocks, a specific number of convolution layers, specific arrangements of image encoder components, and specific input and output sizes, the image segmentation system 106, in one or more implementations, utilizes various combinations, various numbers, various sizes, and/or various arrangements of the above-mentioned components. For instance, the image segmentation system 106 utilizes various input image sizes and generates various output image vector representation sizes from an image encoder. In some instances, the image segmentation system 106 utilizes various numbers of resblock groups and/or various number of resblocks in a resblock group.

Figure 5:
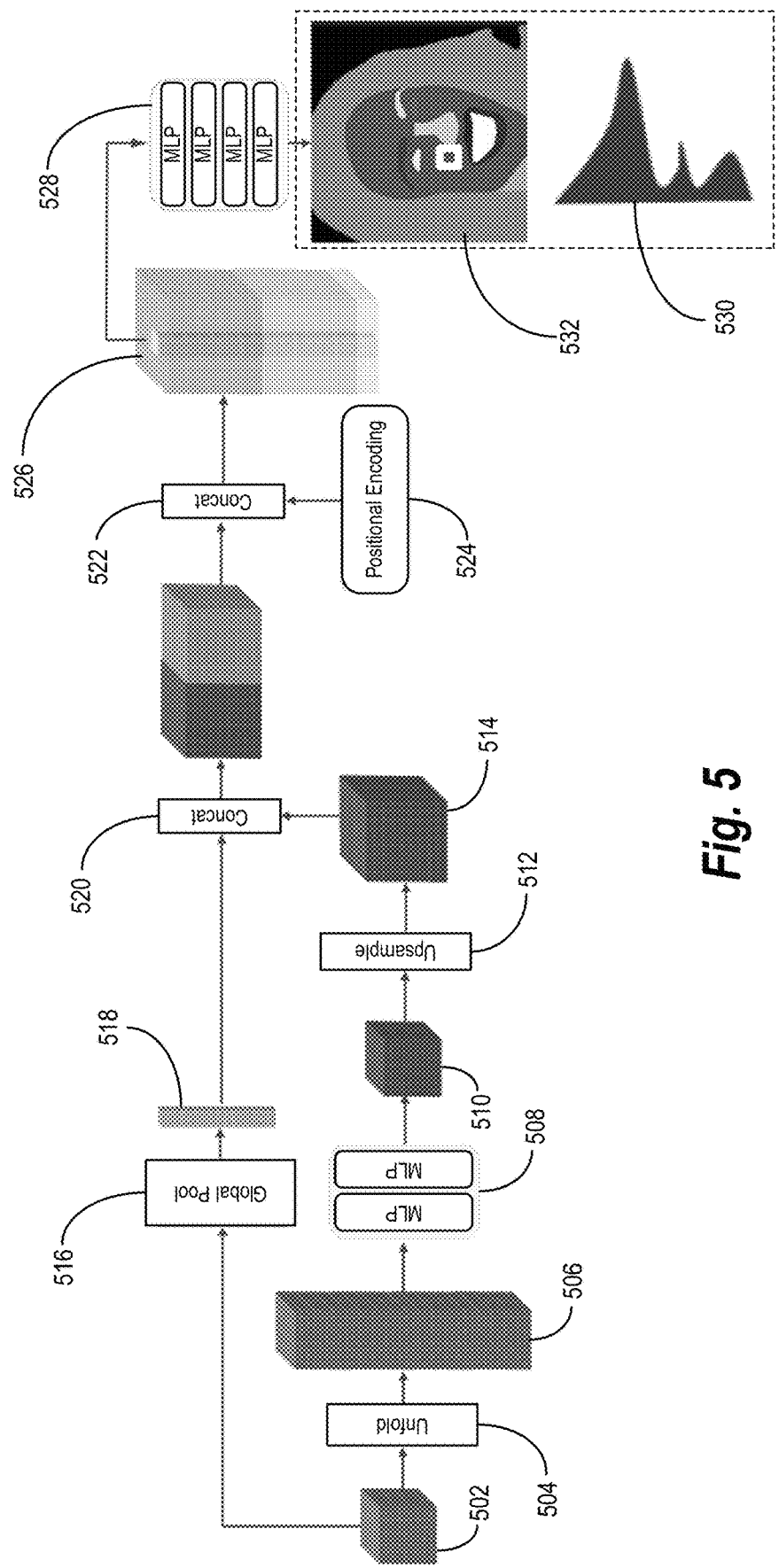
FIG. 5 illustrates an image segmentation system utilizing a local implicit image function network decoder to generate a continuous class label probability distribution from an image vector representation in accordance with one or more implementations.

As mentioned above, in one or more embodiments, the image segmentation system 106 utilizes an image vector representation with a LIIF network decoder to generate a continuous probability distribution in a class label space for an image that indicates class labels for various semantic features within the image. For example, FIG. 5 illustrates the image segmentation system 106 utilizing an LIIF network decoder to generate a continuous class label probability distribution from an image vector representation. In addition, FIG. 5 illustrates the image segmentation system 106 utilizing a LIIF network decoder with a reduced channel image vector representation and a global pool feature vector to generate the continuous class label probability distribution (and the semantic segmentation mask).

As shown in FIG. 5, for local context, the image segmentation system 106 performs an unfolding operation 504 on an input image vector representation 502 (e.g., a feature grid Z from an image encoder as described above) to generate an unfolded image vector representation 506. Moreover, as shown in FIG. 5, the image segmentation system 106 further utilizes a reduce channel layer 508 (e.g., one or more reduced channel multilayer perceptrons (MLP)) to generate a reduced channel image vector representation 510. Additionally, as shown in FIG. 5, the image segmentation system 106 utilizes an upsampling operation 512 with the reduced channel image vector representation 510 to upsample the reduced channel image vector representation 510 to a given output size image vector representation 514.

In some instances, the image segmentation system 106 passes a latent volume (e.g., an image vector representation) through an unfolding operation (e.g., a 3×3 unfolding operation) to increase a channel size of the latent volume (e.g., to 64×9). In some embodiments, the image segmentation system 106 utilizes feature unfolding to gather local information or context for a local z (from feature grid Z from an image encoder as described above). In some cases, the image segmentation system 106 utilizes an unfolding operation by concatenating (e.g., via stacking) a local z from feature grid Z from an image encoder as described above) in a 3×3 neighborhood (for each z in the feature grid Z) to unfold the feature grid Z of dimension (H×W×D) to unfolded dimensions (H×W×9D).

Moreover, the image segmentation system 106 further utilizes the unfolded latent volume (e.g., an unfolded image vector representation) with a reduction channel (e.g., a two-layer reduce channel MLP with depths of 256 and 64) to generate a reduced channel image vector representation (e.g., a latent volume 2 of size 64×64×64). Indeed, in one or more embodiments, a reduced channel image vector representation enables less tasking (or less expensive) computations during subsequent upsampling operations. Furthermore, in one or more implementations, the image segmentation system 106 upsamples a reduced channel image vector representation to the output size image vector representation (using upsampling approaches, such as, but not limited to bilinear transformation, discrete cosine transformation, and/or z-transformation).

Furthermore, as shown in FIG. 5, for global context, the image segmentation system 106 performs a global pooling operation 516 on the input image vector representation 502 to generate a global pool feature vector 518. In some cases, the image segmentation system 106 utilizes global average pooling of a latent volume (e.g., an image vector representation) along spatial dimensions to generate a global pool feature vector. In some implementations, the image segmentation system 106 utilizes various global pooling operations, such as, but not limited to, max pooling and/or average pooling to generate a global pool feature vector from an image vector representation.

Additionally, as shown in FIG. 5, the image segmentation system 106 further combines the output size image vector representation 514 (from the reduced channel image vector representation 510) with the global pool feature vector 518 to generate a combined image vector representation 526. For example, as shown in FIG. 5, the image segmentation system 106 performs a concatenation operation 520 on the output size image vector representation 514 and the global pool feature vector 518 to concatenate the output size image vector representation 514 and the global pool feature vector 518 into the combined image vector representation 526. Moreover, as shown in FIG. 5, the image segmentation system 106 also utilizes a positional encoding operation 524 while concatenating, with a concatenating operation 522, the output size image vector representation 514 and the global pool feature vector 518 (e.g., to normalize coordinates of the combined image vector representation 526). In some instances, the image segmentation system 106 utilizes positional encodings that are x and y coordinates ranging from −1 to 1 along a spatial dimension of the image vector representation (e.g., a combined image vector representation).

In addition, as shown in FIG. 5, the image segmentation system 106 further utilizes the combined image vector representation 526 with one or more MLP layers 528 to generate a continuous class label probability distribution 530 (and a semantic segmentation mask 532). In one or more implementations, the image segmentation system 106 flattens a combined image vector representation and passes the flattened image vector representation through one or more MLPs to predict logits for segmentation class labels. In some cases, the image segmentation system 106 passes the flattened image vector representation through a 4-layer MLP of 256 channels each. In one or more instances, the image segmentation system 106 generates a continuous class label probability distribution for one or more class labels (as described above) from the predicted logits (obtained from the image vector representation passed through one or more MLPs).

Furthermore, in one or more cases, the image segmentation system 106 performs a LIIF-based ensemble of the predicted logits for segmentation class labels utilizing multiple grid samplings over the image vector representation (e.g., reduced channel image vector representation and/or the combined channel image vector representation). In some cases, the image segmentation system 106 generates a semantic segmentation mask (as described above) by performing a LIIF-based ensemble of the predicted logits (utilizing multiple grid samplings). In particular, in one or more embodiments, the image segmentation system 106 utilizes query coordinates (as described above) to generate predicted semantic class labels from the continuous class label probability distribution generated using the predicted logits.

Although one or more embodiments herein describe the image segmentation system 106 utilizing a specific number of MLPs, a specific arrangement of LIIF network decoder components, and specific input and output sizes, the image segmentation system 106, in one or more implementations, utilizes various combinations, various numbers, various sizes, and/or various arrangements of the above-mentioned components. For instance, the image segmentation system 106 utilizes various input image vector representation sizes and generates various output semantic segmentation label masks from a LIIF network decoder. In some instances, the image segmentation system 106 utilizes various numbers of MLPs within the LIIF network decoder.

Figure 6:
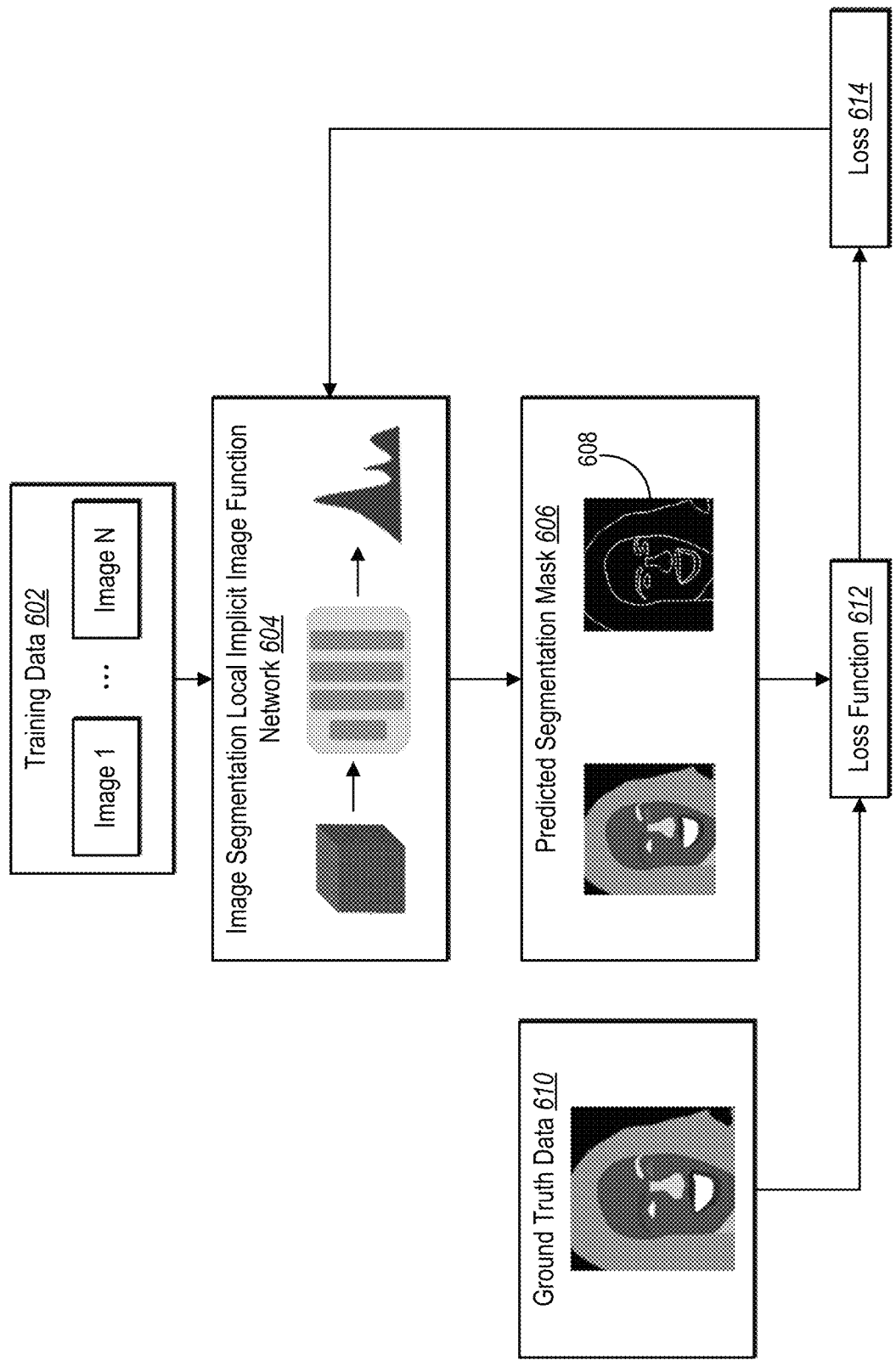
FIG. 6 illustrates an image segmentation system training an image segmentation local implicit image function network in accordance with one or more implementations.

In one or more embodiments, the image segmentation system 106 trains the image segmentation local implicit image function network (e.g., the LIIF network described in reference to FIGS. 2-5). In particular, FIG. 6 illustrates the image segmentation system 106 training the image segmentation local implicit image function network. Indeed, FIG. 6 illustrates the image segmentation system 106 causing the image segmentation local implicit image function network to learn parameters to accurately perform image segmentation (e.g., human face semantic segmentation) with a continuous class label probability distribution.

For example, as shown in FIG. 6, provides images from training data 602 to an image segmentation local implicit image function (LIIF) network 604 (a LIIF-based network in accordance with one or more implementations herein). Furthermore, as illustrated in FIG. 6, the image segmentation system 106 utilizes the image segmentation LIIF network 604 to generate continuous class label probability distributions and predicted segmentation masks 606 and/or an edge aware mask 608 from the predicted segmentation masks 606 (for the images in the training data 602). Furthermore, as shown in FIG. 6, the image segmentation system 106 utilizes a loss function 612 to compare the ground truth data 610 (e.g., ground truth semantic segmentation masks having known semantic regions that correspond to the training data 602) to generate a loss 614. In addition, as shown in FIG. 6, the image segmentation system 106 utilizes the loss 614 to learn parameters of the image segmentation LIIF network 604 (e.g., using backpropagation to penalize the network if it generates an incorrect prediction).

In one or more implementations, the image segmentation system 106 passes output (or logits) of the image segmentation LIIF network through a softmax and then guides (or learns) parameters of the image segmentation LIIF network with a cross-entropy loss $L_{cce}$ and an edge aware cross-entropy loss $L_{e\_cce}$. In particular, in one or more embodiments, the image segmentation system 106 determines an edge-aware loss by extracting edges of a ground truth label map utilizing an edge detection kernel (e.g., binary edge generation). Then, in one or more embodiments, the image segmentation system 106 determines a cross-entropy loss specifically on the extracted edges. In some instances, the image segmentation system 106 determines a loss L (for learning parameters of the image segmentation LIIF network) from the cross-entropy loss $L_{cce}$ and the edge aware cross-entropy loss $L_{e\_cce}$ in accordance with the following function:

$$L = L_{cce} + \lambda . L_{e\_cce} \qquad (5)$$

In one or more embodiments, the image segmentation system 106 utilizes an additional weight $\lambda$ in the above-mentioned function (5).

Although one or more embodiments illustrate the image segmentation system 106 utilizing a cross-entropy loss and an edge aware cross-entropy loss to learn parameters of an image segmentation LIIF network, the image segmentation system 106 utilizes, in one or more instances, various combinations of loss generated between predicted semantic segmentation masks (or outputs of the image segmentation LIIF network) and ground truth labels for training data. For instance, the image segmentation system 106 utilizes cross-entropy loss separately from edge aware cross-entropy loss. In one or more implementations, the image segmentation system 106 utilizes various training loss functions, such as, but not limited to, mean squared error loss function and/or cosine similarity loss function.

As mentioned above, the image segmentation system 106 accurately and efficiently utilize a local implicit image function network to perform image segmentation (e.g., human face semantic segmentation) with a continuous class label probability distribution. To illustrate, experimenters utilized an implementation of an image segmentation system (as described above) to compare results with various conventional systems. For example, FIGS. 7 and 8 illustrate visual comparisons of segmentation results for various images between a ground truth mask, a segmentation mask created using decoupled multi-task learning with cyclical self-regulation (DML-CSR) as described in Qi Zheng, *Decoupled Multi-task Learning with Cyclical Self-Regulation for Face Parsing*, Computer Vision and Pattern Recognition (2022), and a segmentation mask created using an implementation of a face parsing local implicit image function network (FP-LIIF) from the image segmentation system (as described above).

Figure 7:
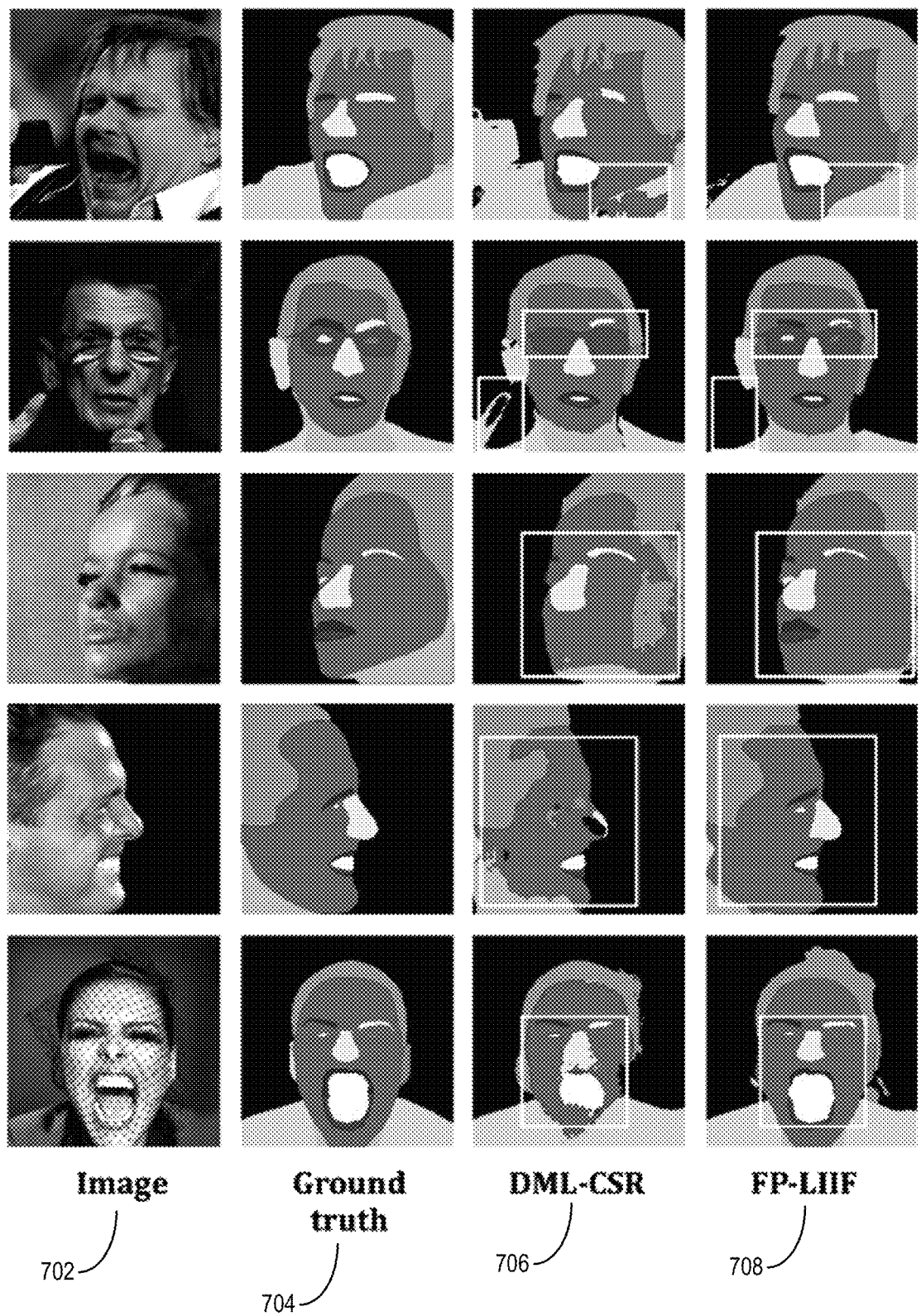
FIGS. 7 and 8 illustrate experimental benchmarks of an implementation of an image segmentation system and various other segmentation models.

For instance, FIG. 7 illustrates results for images 702 from a CelebAMask-HQ dataset. Indeed, FIG. 7 illustrates ground truth semantic masks 704 for the images 702. Furthermore, FIG. 7 also illustrates segmentation masks 706 generated using the DML-CSR model. Additionally, FIG. 7 also illustrates segmentation masks 708 generated using an implementation of an FP-LIIF from the image segmentation system (as described above). Indeed, as shown in FIG. 7, the segmentation masks 708 includes more accurately predicted labeled semantic regions in comparison to the segmentation masks 706 in various images 702 from the CelebAMask-HQ dataset.

Figure 8:
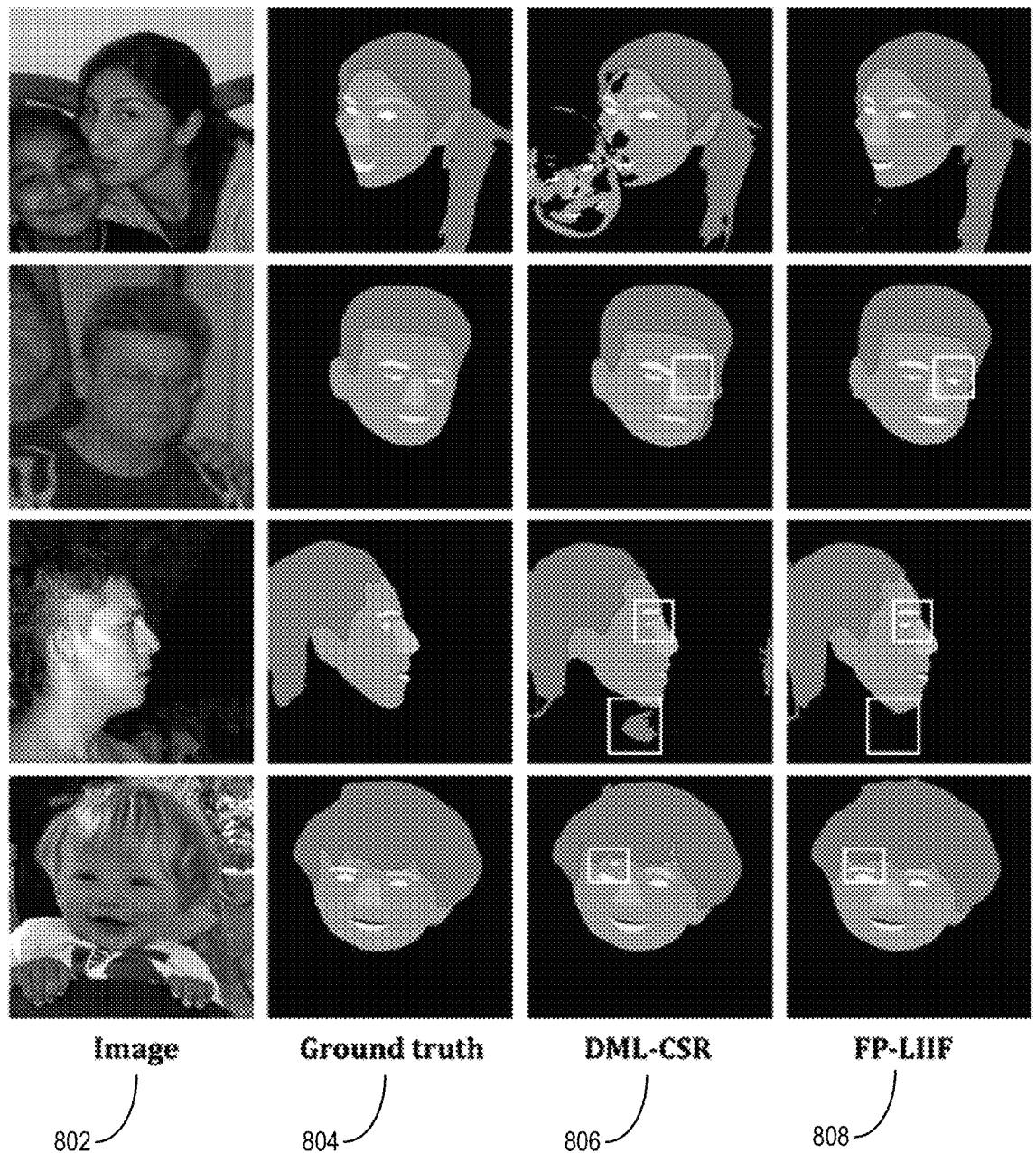

Furthermore, FIG. 8 illustrates results for images 802 from a LaPa dataset. Indeed, FIG. 8 illustrates ground truth semantic masks 804 for the images 802. Furthermore, FIG. 8 also illustrates segmentation masks 806 generated using the DML-CSR model. Additionally, FIG. 8 also illustrates segmentation masks 808 generated using an implementation of an FP-LIIF from the image segmentation system (as described above). Indeed, as shown in FIG. 8, the segmentation masks 808 includes more accurately predicted labeled semantic regions in comparison to the segmentation masks 806 in various images 802 from the LaPa dataset.

Furthermore, experimenters utilized three image datasets (LaPa dataset, CelebAMask-HQ dataset, and Helen dataset) with implementations of the image segmentation system (as described above) to evaluate F1 score comparisons (i.e., an F-score to measure accuracy with ground truth masks from the image datasets) for the implementations of the image segmentation system and various conventional systems for various semantic labels. Indeed, the experimenters compared implementations of the image segmentation system (as described above) to a segmentation method as described in Wei et. al, *Accurate Facial Image Parsing at Real-Time Speed*, IEEE Transactions on Image Processing (2019) (hereinafter Wei), an EAGR method (as described in Te et al., *Edge-Aware Graph Representation Learning and Reasoning for Face Parsing*, European Conference on Computer Vision (2020), a FARL method (as described in Zheng et al., *General Facial Representation Learning in a Visual-Linguistic Manner*, Proceedings of the IEEE/CVF Conference on Computer Vision and Pattern Recognition (2022)), an AGRNET method (as described in Te et al., *Agrnet: Adaptive Graph Representation Learning and Reasoning for Face Parsing*, IEEE Transactions on Image Processing (2021), and DML-CSR method (as described in Qi Zheng, *Decoupled Multi-task Learning with Cyclical Self-Regulation for Face Parsing*, Computer Vision and Pattern Recognition (2022)).

Additionally, the experimenters used various implementations of the image segmentation system (as described above) with an output resolution and input resolution of 256×256 (FP-LIIF), with an output resolution of 512 and an input resolution of 256×256 (FP-LIIF$^{512}$), and FP-LIIF$^{192 \to 256}$, FP-LIIF$^{128 \to 256}$, FP-LIIF$^{96 \to 256}$, and FP-LIIF$^{64 \to 256}$ denoting results of upsampling from output resolution 192, 128, 96, and 64 respectively to a resolution of 256. Indeed, the higher output resolution of 512 is achieved using an implementation of the image segmentation system (as described above) for an input resolution of 256 without additional training for the higher output size by seamlessly scaling the resolution of the output (as described above). Furthermore, the experimenters utilized class-wise F1 score and a mean F1 score. Additionally, the experimenters also use a mean intersection over union (mIoU) to compare various implementations of the image segmentation system (as described above) with DML-CSR. The experimenters further did not include a background class in the following metrics.

Moreover, the experimenters trained the various implementations of the image segmentation system (as described above) on the above-mentioned image datasets by modifying the images in the dataset. In particular, the experimenters resized images in the above-mentioned image datasets using bicubic sampling (to fit an input size of 256×256) and applied various augmentations, such as, random affine transformations of rotations b, shear, scaling followed by random cropping, and color jitter.

For example, Table 1 below illustrates results (F1 scores) on a LaPa dataset between the above-mentioned conventional systems and various implementations of the image segmentation system. Indeed, as shown in Table 1, various implementations of the image segmentation system (even the higher 512 output size implementation without additional training) match and/or surpass F1 scores in identifying various semantic labels in comparison to the above-mentioned conventional systems on the LaPa dataset of images.

TABLE 1

| Method | Skin | Hair | Nose | I-Mouth | L-Eye | R-Eye | L-Brow | R-Brow | U-Lip | L-Lip | Mean |
|---|---|---|---|---|---|---|---|---|---|---|---|
| Wei | 96.1 | 95.1 | 96.1 | 89.2 | 88.9 | 87.5 | 86 | 87.8 | 83.1 | 83.8 | 89.36 |
| EAGR | 97.3 | 96.2 | 97.1 | 90 | 89.5 | 90 | 86.5 | 87 | 88.1 | 89 | 91.07 |
| FARL$^{Scratch}$ | 97.2 | 93.1 | 97.3 | 89.4 | 91.6 | 91.5 | 90.1 | 89.7 | 87.2 | 89.1 | 91.62 |
| AGRNET | 97.7 | 96.5 | 97.3 | 90.7 | 91.6 | 91.1 | 89.9 | 90 | 88.5 | 90.1 | 92.34 |
| DML-CSR | 97.6 | 96.4 | 97.3 | 90.5 | 91.8 | 91.5 | 90.4 | 90.4 | 88 | 89.9 | 92.38 |
| FP-LIIF | 97.6 | 96 | 97.2 | 90.3 | 92 | 92.2 | 90.9 | 90.6 | 87.8 | 89.5 | 92.41 |
| FP-LIIF512 | 97.5 | 95.9 | 97.2 | 90.3 | 92 | 92.2 | 90.9 | 90.6 | 87.7 | 89.5 | 92.38 |
| FP-LIIF$^{192 \to 256}$ | 97.5 | 96 | 97.2 | 90.3 | 92 | 92.1 | 90.8 | 90.5 | 87.7 | 89.4 | 92.35 |
| FP-LIIF$^{128 \to 256}$ | 97.5 | 96 | 97.2 | 90.2 | 91.6 | 91.8 | 90.8 | 90.4 | 87.5 | 89.3 | 92.23 |
| FP-LIIF$^{96 \to 256}$ | 97.4 | 95.9 | 97.2 | 90 | 90.1 | 90.5 | 90.5 | 90.2 | 87 | 88.9 | 91.76 |
| FP-LIIF$^{64 \to 256}$ | 97.1 | 95.8 | 97 | 89.4 | 85.5 | 86.2 | 88.8 | 88.6 | 85 | 87.8 | 90.12 |

Furthermore, Table 2 below illustrates results (F1 scores) on a CelebAMask-HQ dataset between the above-mentioned conventional systems and various implementations of the image segmentation system. Indeed, as shown in Table 2, various implementations of the image segmentation system (even the higher 512 output size implementation without additional training) also match and/or surpass F1 scores in identifying various semantic labels in comparison to the above-mentioned conventional systems on the CelebAMask-HQ dataset of images.

TABLE 2

| Method | Skin Mouth | Nose U-Lip | E-Glasses L-Lip | L-Eye Hair | R-Eye Hat | L-Brow Earring | R-Brow Necklace | L-Ear Neck | R-Ear Cloth | Mean |
|---|---|---|---|---|---|---|---|---|---|---|
| Wei | 96.4 | 91.9 | 89.5 | 87.1 | 85 | 80.8 | 82.5 | 84.1 | 83.3 | 82.05 |
|  | 90.6 | 87.9 | 91 | 91.1 | 83.9 | 65.4 | 17.8 | 88.1 | 80.6 |  |
| FARL$^{Scratch}$ | 96.2 | 93.8 | 92.3 | 89 | 89 | 85.3 | 85.4 | 86.9 | 87.3 | 84.77 |
|  | 91.7 | 88.1 | 90 | 94.9 | 82.7 | 63.1 | 33.5 | 90.8 | 85.9 |  |
| EAGR | 96.2 | 94 | 92.3 | 88.6 | 88.7 | 85.7 | 85.2 | 88 | 85.7 | 85.14 |
|  | 95 | 88.9 | 91.2 | 94.9 | 87.6 | 68.3 | 27.6 | 89.4 | 85.3 |  |
| AGRNET | 96.5 | 93.9 | 91.8 | 88.7 | 89.1 | 85.5 | 85.6 | 88.1 | 88.7 | 85.53 |
|  | 92 | 89.1 | 91.1 | 95.2 | 87.2 | 69.6 | 32.8 | 89.9 | 84.9 |  |
| DML-CSR | 95.7 | 93.9 | 92.6 | 89.4 | 89.6 | 85.5 | 85.7 | 88.3 | 88.2 | 86.07 |
|  | 91.8 | 87.4 | 91 | 94.5 | 88.5 | 71.4 | 40.6 | 89.6 | 85.7 |  |
| FP-LIIF | 96.6 | 94 | 92.4 | 89.6 | 89.7 | 85.2 | 84.9 | 86.7 | 86.6 | 86.07 |
|  | 92.6 | 89.4 | 91.1 | 95.2 | 86.8 | 66.9 | 43.9 | 91.3 | 86.7 |  |
| FP-LIIF$^{512}$ | 96.6 | 94 | 92.5 | 90 | 90.1 | 85.6 | 85.4 | 86.8 | 86.7 | 86.14 |
|  | 92.7 | 89.4 | 91.3 | 95.2 | 86.7 | 67.2 | 42.2 | 91.4 | 86.8 |  |
| FP-LIIF$^{192 \to 256}$ | 96.6 | 94 | 92.4 | 89.6 | 89.7 | 85.2 | 84.9 | 86.7 | 86.6 | 86.05 |
|  | 92.5 | 89.1 | 91.1 | 95.2 | 86.8 | 66.9 | 43.8 | 91.3 | 86.6 |  |
| FP-LIIF$^{128 \to 256}$ | 96.6 | 93.9 | 92.4 | 89.6 | 89.6 | 85.2 | 84.9 | 86.7 | 86.6 | 86.03 |
|  | 92.5 | 88.9 | 91 | 95.2 | 86.8 | 66.9 | 43.9 | 91.3 | 86.6 |  |
| FP-LIIF$^{96 \to 256}$ | 96.5 | 93.9 | 92.3 | 89.3 | 89.3 | 85.1 | 84.8 | 86.7 | 86.5 | 85.90 |
|  | 92.4 | 88.6 | 90.9 | 95.1 | 86.7 | 66.7 | 43.6 | 91.3 | 86.6 |  |
| FP-LIIF$^{64 \to 256}$ | 96.4 | 93.7 | 92.1 | 88.5 | 88.5 | 84.5 | 84.3 | 86.4 | 86.3 | 85.52 |
|  | 92.1 | 87.5 | 90.3 | 95.1 | 86.6 | 65.7 | 43.7 | 91.2 | 86.5 |  |

Additionally, Table 3 below illustrates results (F1 scores) on a Helen dataset between the above-mentioned conventional systems and an implementation of the image segmentation system. Indeed, as shown in Table 3, the implementation of the image segmentation system achieves similar F1 scores in identifying various semantic labels in comparison to the above-mentioned conventional systems on the Helen dataset of images.

TABLE 3

| Model | Skin L-Lip | Nose Eyes | U-Lip Brows | I-Mouth Mouth | Overall |
|---|---|---|---|---|---|
| EAGR | 94.6 | 96.1 | 83.6 | 89.8 | 93.2 |
|  | 91 | 90.2 | 84.9 | 95.5 |  |
| DML-CSR | 96.6 | 95.5 | 87.6 | 91.2 | 93.8 |
|  | 91.2 | 90.9 | 88.5 | 95.9 |  |
| FP-LIIF | 95.1 | 94 | 79.7 | 86.3 | 91.2 |
|  | 87.6 | 89.1 | 81 | 93.6 |  |

The experimenters also evaluated a comparison of model sizes, Gflops, and frames per second (FPS) of the various models (as shown in table 4 below). Indeed, in addition to achieving similar or better accuracies to many conventional systems (as shown above with reference to Tables 1-3), the implementation of the image segmentation system (as described above) was more compact and faster than conventional systems. In particular, as shown in Table 4, the implementation of the image segmentation system (as described above) was 65 times smaller than FARL and 26 times more compact than DML-CSR. Furthermore, as shown in Table 4, the implementation of the image segmentation system (as described above) achieved greater FPS performance.

TABLE 4

| Model | Params ↓ | xFP-LIIF ↓ | GFlops ↓ | FPS ↑ |
|---|---|---|---|---|
| DML-CSR | 59.67 M | 26 | 253 | 76 |
| EAGR | 66.72 M | 29 | 235 | 71 |
| FARL | 150 M | 65 | 370 | 26 |
| FP-LIIF | 2.29 M | 1 | 85 | 110 |

In addition, the experimenters also conducted ablation studies to evaluate the effect of several components of an implementation of the image segmentation system (as described above). In particular, the experimenters replaced the LIIF decoder from an implementation of the image segmentation system 106 (as described above) with a convolution U-Net type decoder to result in a parameter count of 9.31 M (3×FP-LIIF) and a mean F1 on the LaPa dataset of 84.9 in comparison to the 92.4 of FP-LIIF (an implementation of the image segmentation system as described above). Furthermore, in another ablation study, the experimenters utilized an image encoder as described in Bee Lim (i.e., an EDSR model) instead of an implementation of an image encoder of the image segmentation system as described above (e.g., with Resblocks using instance normalization and/or batch normalization). The image encoder as described in Bee Lim (i.e., an EDSR model) resulted in an F1 score of 92.3 on the LaPa dataset (for class label detection) while an implementation of the image encoder of the image segmentation system as described above (with instance normalization) resulted in an F1 score of 92.4 and an implementation of the image encoder of the image segmentation system as described above (with batch normalization) resulted in an F1 score of 92.32.

Additionally, the experimenters evaluated the effect of edge-aware cross entropy loss and a weight λ (as described in function (5) above) in an implementation of the image segmentation system (as described above). For instance, Table 5 below illustrates the effect of edge-aware loss modulated by λ on the performance of an implementation of the image segmentation system (as described above) on the LaPa dataset.

TABLE 5

| λ | 0 | 10 | 20 | 30 | 40 |
|---|---|---|---|---|---|
| F1 on LaPa | 91.73 | 92.2 | 92.29 | 92.34 | 92.4 |

Additionally, the experimenters evaluated results for face segmentation on LaPa using a lightweight segmentation network for cityscapes (SFNet) as described in Xiangtai Li et al., *Semantic Flow for Fast and Accurate Scene Parsing*, ECCV (2020) in comparison to an implementation of the image segmentation system (as described above). In particular, Table 6 (below) illustrates resulting F1 score comparisons between SFNet and an implementation of the image segmentation system (as described above) for face segmentation on the LaPa image dataset.

TABLE 6

| Method | Skin | Hair | Nose | I-Mouth | L-Eye | R-Eye | L-Brow | R-Brow | U-Lip | L-Lip | Mean |
|---|---|---|---|---|---|---|---|---|---|---|---|
| SFNet | 94.75 | 87.27 | 98.71 | 78.86 | 79.55 | 76.12 | 76.98 | 73.8 | 97.28 | 96.23 | 85.96 |
| FP-LIIF | 97.6 | 96 | 97.2 | 90.3 | 92 | 92.2 | 90.9 | 90.6 | 87.8 | 89.5 | 92.41 |

Additionally, as mentioned above, in one or more embodiments, the image segmentation system 106 predicts segmentation masks at multiple resolutions by performing a low-resolution prediction and upscaling the output semantic segmentation mask to a higher resolution (e.g., lower-resolution inference) while experiencing minimal loss in accuracy (as shown in the F1 scores in Tables 1 and 2 for various resolution implementations of the image segmentation system as described above). The experimenters evaluated FPS and FLOPS for different resolution output while using a constant input image resolution of 256×256 in an implementation of the image segmentation system (as described above) as shown in Table 7 below.

TABLE 7

| Res | 64 × 64 | 96 × 96 | 128 × 128 | 192 × 192 | 256 × 256 |
|---|---|---|---|---|---|
| FPS | 445 | 332 | 294 | 187 | 110 |
| FLOPS | 27.44 | 32.25 | 39 | 58.24 | 85.2 |

Figure 9:
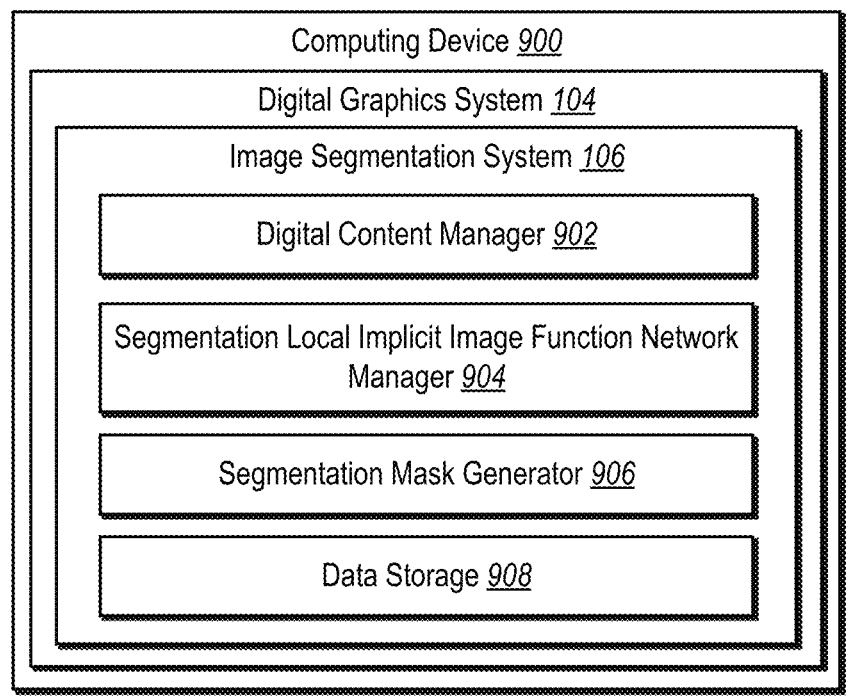
FIG. 9 illustrates a schematic diagram of an image segmentation system in accordance with one or more implementations.

Turning now to FIG. 9, additional detail will be provided regarding components and capabilities of one or more embodiments of the image segmentation system. In particular, FIG. 9 illustrates an example image segmentation system 106 executed by a computing device 900 (e.g., the server device(s) 102, the client device 110). As shown by the embodiment of FIG. 9, the computing device 900 includes or hosts the digital graphics system 104 and the image segmentation system 106. Furthermore, as shown in FIG. 9, the digital graphics system 104 includes a digital content manager 902, a segmentation local implicit image function network manager 904, a segmentation mask generator 906, and data storage 908.

As just mentioned, and as illustrated in the embodiment of FIG. 9, the image segmentation system 106 includes the digital content manager 902. For example, the digital content manager 902 identifies, receives, captures, uploads, stores, modifies and/or renders digital content as described above (e.g., in relation to FIGS. 1-3). In some instances, the digital content manager 902 identifies, receives, captures, uploads, stores, modifies, and/or renders digital images (based on semantic segmentation masks) as described above (e.g., in relation to FIGS. 1-3).

Moreover, as shown in FIG. 9, the image segmentation system 106 includes the segmentation local implicit image function network manager 904. In some embodiments, the segmentation local implicit image function network manager 904 utilizes an image encoder to generate an image vector representation from an image as described above (e.g., in relation to FIGS. 2-4). Additionally, the segmentation local implicit image function network manager 904 utilizes a LIIF network-based encoder to generate a continuous class probability distribution from an image vector representation as described above (e.g., in relation to FIGS. 2-3 and 5-6).

Additionally, as shown in FIG. 9, the image segmentation system 106 includes the segmentation mask generator 906. In some embodiments, the segmentation mask generator 906 utilizes a continuous class probability distribution to generate a semantic segmentation mask that includes labeled semantic regions (e.g., labeled facial feature regions) for a digital image as described above (e.g., in relation to FIGS. 2-3, and 5). In some instances, the segmentation mask generator 906 also utilizes upsample coordinates to upscale a resolution of a semantic segmentation mask without changing an input size to the image segmentation local implicit image function network as described above (e.g., in relation to FIGS. 2-5).

As further shown in FIG. 9, the image segmentation system 106 includes the data storage 908. In some embodiments, the data storage 908 maintains data to perform one or more functions of the image segmentation system 106. For example, the data storage 908 includes images, image encoders, image vector representations, LIIF networks, parameters for the image encoders and/or LIIF networks, and/or semantic segmentation masks.

Each of the components 902-908 of the computing device 900 (e.g., the computing device 900 implementing the image segmentation system 106), as shown in FIG. 9, may be in communication with one another using any suitable technology. The components 902-908 of the computing device 900 can comprise software, hardware, or both. For example, the components 902-908 can comprise one or more instructions stored on a computer-readable storage medium and executable by processor of one or more computing devices. When executed by the one or more processors, the computer-executable instructions of the image segmentation system 106 (e.g., via the computing device 900) can cause a client device and/or server device to perform the methods described herein. Alternatively, the components 902-908 and their corresponding elements can comprise hardware, such as a special purpose processing device to perform a certain function or group of functions. Additionally, the components 902-908 can comprise a combination of computer-executable instructions and hardware.

Furthermore, the components 902-908 of the image segmentation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-908 may be implemented as a stand-alone application, such as a desktop or mobile application. Furthermore, the components 902-908 may be implemented as one or more web-based applications hosted on a remote server. The components 902-908 may also be implemented in a suite of mobile device applications or "apps." To illustrate, the components 902-908 may be implemented in an application, including but not limited to, ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUSTRATOR," or "ADOBE SUBSTANCE" are either registered trademarks or trademarks of Adobe Inc. in the United States and/or other countries.

Figure 10:
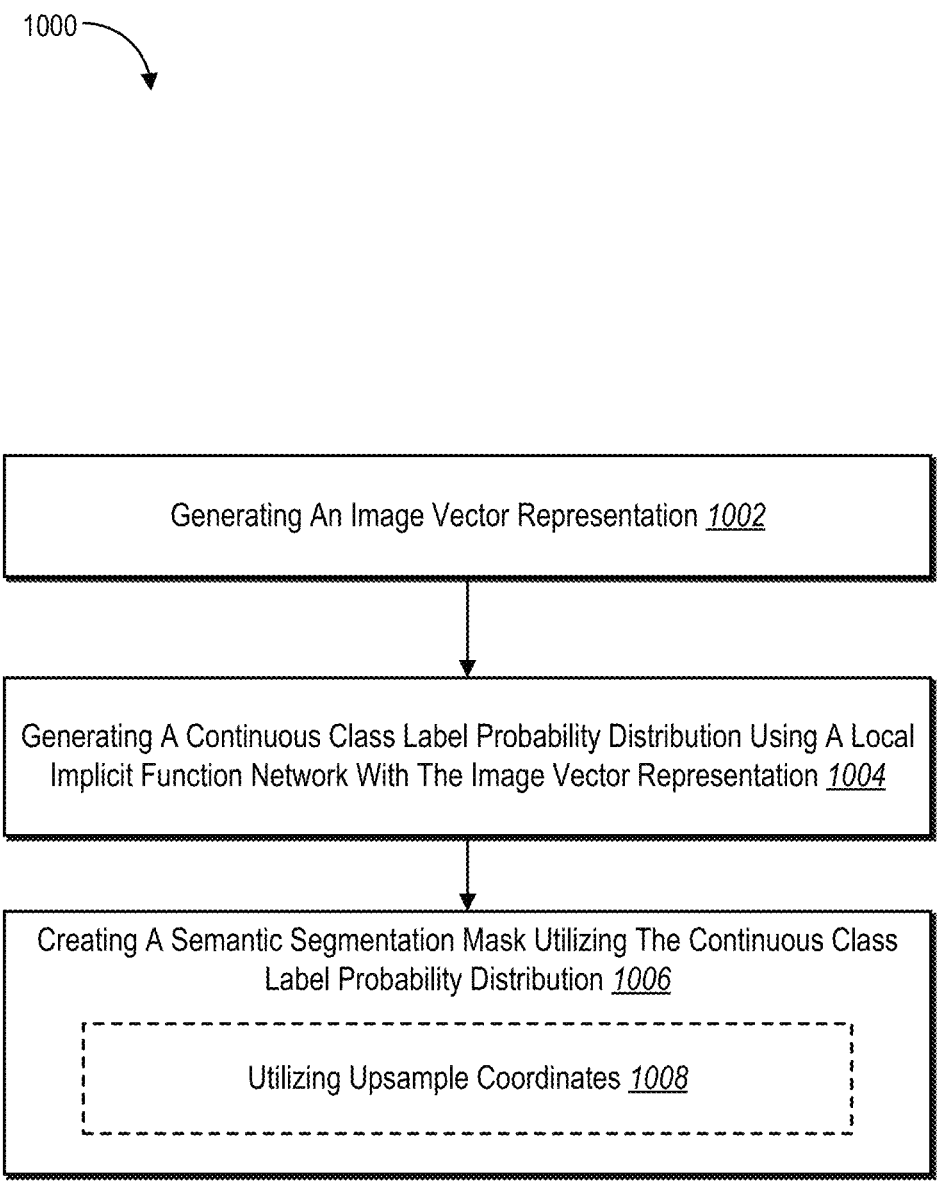
FIG. 10 illustrates a flowchart of a series of acts for utilizing a local implicit image function network to perform image segmentation with a continuous class label probability distribution in accordance with one or more implementations.

FIGS. 1-9, the corresponding text, and the examples provide a number of different methods, systems, devices, and non-transitory computer-readable media of the image segmentation system 106. In addition to the foregoing, one or more embodiments can also be described in terms of flowcharts comprising acts for accomplishing a particular result, as shown in FIG. 10. The acts shown in FIG. 10 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 10. In some embodiments, a system can be configured to perform the acts of FIG. 10. Alternatively, the acts of FIG. 10 can be performed as part of a computer implemented method.

As mentioned above, FIG. 10 illustrates a flowchart of a series of acts 1000 for utilizing a local implicit image function network to perform image segmentation with a continuous class label probability distribution in accordance with one or more implementations. While FIG. 10 illustrates acts according to one embodiment, alternative embodiments may omit, add to, reorder, and/or modify any of the acts shown in FIG. 10.

As shown in FIG. 10, the series of acts 1000 include an act 1002 of generating an image vector representation, an act 1004 of generating a continuous class label probability distribution using a local implicit function network with the image vector representation, and an act 1006 of creating a semantic segmentation mask utilizing the continuous class label probability distribution which (in some cases) includes an act 1008 of utilizing upsample coordinates.

In particular, in one or more embodiments, the act 1002 includes generating, utilizing an image encoder, an image vector representation from an image depicting a subject, the act 1004 includes utilizing a local implicit image function neural network to generate a continuous class label probability distribution for one or more class labels from the image vector representation, and the act 1006 includes creating a semantic segmentation mask for the image comprising one or more labeled semantic regions based on the continuous class label probability distribution.

In some instances, the act 1002 includes generating, utilizing a convolutional image encoder, an image vector representation from an image depicting the subject, the act 1004 includes generating, utilizing an local implicit image function neural network, a continuous class label probability distribution for one or more class labels from the image vector representation, and the act 1006 includes selecting a plurality of upsample coordinates for generating a semantic segmentation mask at an upsampled resolution and creating a semantic segmentation mask by generating semantic label predictions at the plurality of upsample coordinates utilizing the continuous class label probability distribution.

Furthermore, in some cases, the act 1002 includes generating, utilizing an image encoder, an image vector representation from an image depicting a human face, the act 1004 includes generating, utilizing a local implicit image function neural network, a continuous class label probability distribution for one or more facial feature labels, and the act 1006 includes creating a semantic segmentation mask for the image comprising one or more labeled facial feature regions based on the continuous class label probability distribution.

In addition, in one or more embodiments, the series of acts 1000 includes utilizing the continuous class label probability distribution for the one or more class labels to determine a class prediction for a coordinate between pixels of the image. In some instances, the series of acts 1000 includes utilizing the continuous class label probability distribution for the one or more facial feature labels to determine a facial feature prediction for a coordinate between pixels of the image.

In some embodiments, the series of acts 1000 includes generating an unfolded image vector representation from the image vector representation utilizing an unfolding operation, generating a reduced channel image vector representation by utilizing one or more multilayer perceptron decoders to reduce channels of the unfolded image vector representation, and generating the continuous class label probability distribution for the one or more class labels from the reduced channel image vector representation. In some cases, the series of acts 1000 includes generating a global pool feature vector from the image vector representation utilizing global pooling and generating the continuous class label probability distribution for the one or more class labels from the global pool feature vector. In some instances, the series of acts 1000 includes generating, utilizing the local implicit image function neural network, the continuous class label probability distribution by utilizing a reduced channel image vector representation based on the image vector representation and a global pool feature vector based on the image vector representation. In some instances, the series of acts 1000 includes generating, utilizing the local implicit image function neural network, the continuous class label probability distribution based on a reduced channel image vector representation generated utilizing one or more multilayer perceptron decoders with the image vector representation and a global pool feature vector generated utilizing global pooling on the image vector representation.

Moreover, the series of acts 1000 includes an image encoder that includes a residual block comprising instance normalization layers and convolution layers. In some cases, the series of acts 1000 includes an image encoder that includes strided convolution layers between one or more residual blocks.

Additionally, in some embodiments, the series of acts 1000 includes selecting a plurality of upsample coordinates for generating the semantic segmentation mask at an upsampled resolution and creating the semantic segmentation mask by generating semantic label predictions at the plurality of upsample coordinates utilizing the continuous class label probability distribution. In some cases, the series of acts 1000 includes generating the image depicting the subject by downsampling a higher resolution image depicting the subject. Moreover, the series of acts 1000 includes utilizing the continuous class label probability distribution for the one or more class labels to determine a class prediction for an upsample coordinate from the plurality of upsample coordinates between pixels of the image. In some cases, the series of acts 1000 includes creating the semantic segmentation mask at an upsampled resolution by generating semantic label predictions at a plurality of upsample coordinates utilizing the continuous class label probability distribution.

In some cases, the series of acts 1000 includes utilizing the semantic segmentation mask to edit the one or more labeled semantic regions in the image. In one or more embodiments, the series of acts 1000 includes a semantic segmentation mask that includes one or more labeled semantic regions based on the semantic label predictions at the plurality of upsample coordinates and further utilizing the semantic segmentation mask to edit the one or more labeled semantic regions in a higher resolution image of the image. In some cases, the series of acts 1000 includes utilizing the semantic segmentation mask to edit the one or more labeled facial feature regions in the image.

Furthermore, the series of acts 1000 includes learning parameters of the local implicit image function neural network utilizing an edge-aware loss using a ground truth image with edges for known semantic regions of the ground truth image.

In some cases, the series of acts 1000 includes facial feature labels, such as, but not limited to, an eye label, a nose label, a lips label, a skin label, an eyebrows label, a teeth label, and a hair label.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
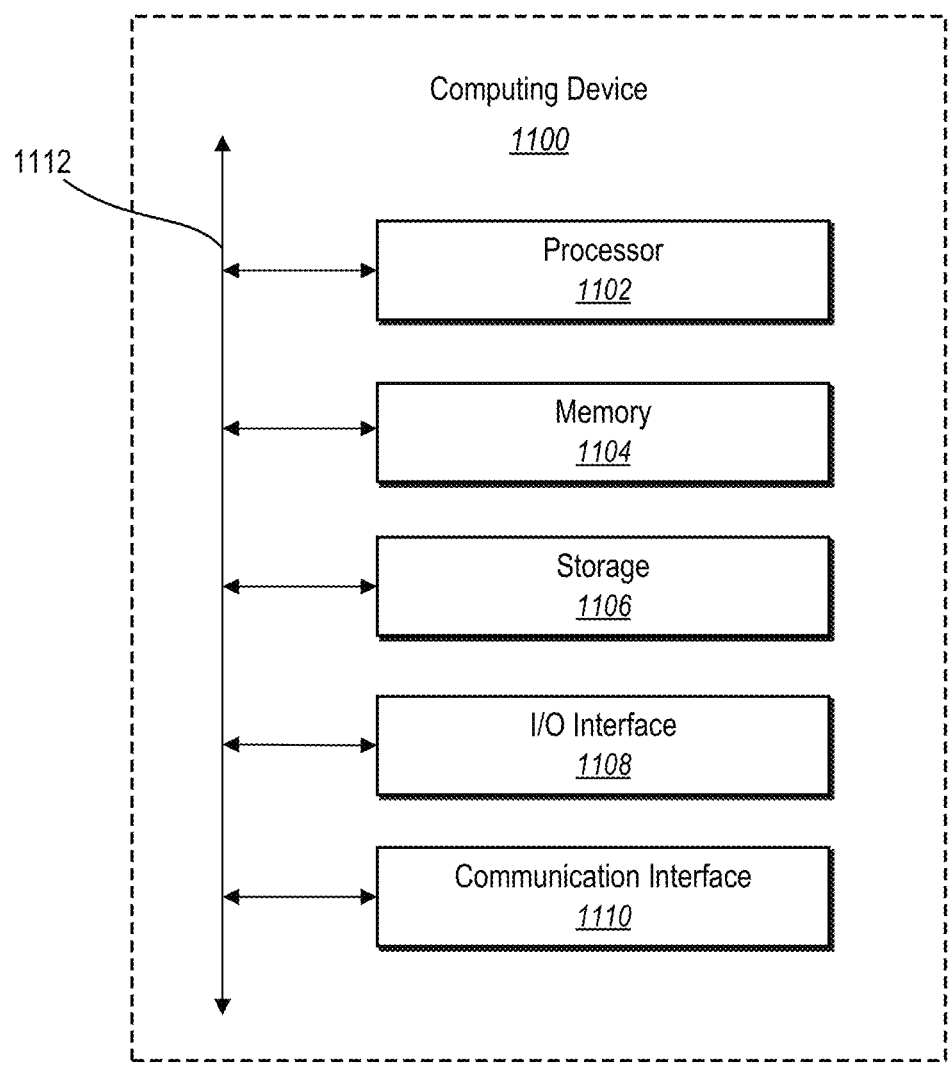
FIG. 11 illustrates a block diagram of an example computing device in accordance with one or more implementations.

FIG. 11 illustrates a block diagram of an example computing device 1100 that may be configured to perform one or more of the processes described above. One will appreciate that one or more computing devices, such as the computing device 1100 may represent the computing devices described above (e.g., the server device(s) 102 and the client device 110). In one or more implementations, the computing device 1100 may be a mobile device (e.g., a mobile telephone, a smartphone, a PDA, a tablet, a laptop, a camera, a tracker, a watch, a wearable device, etc.). In some implementations, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other implementations. Furthermore, in certain implementations, the computing device 1100 includes fewer components than those shown in FIG. 11. Components of the computing device 1100 shown in FIG. 11 will now be described in additional detail.

In particular implementations, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive ("HDD"), flash memory, a Universal Serial Bus ("USB") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1110 can further include a bus 1112. The bus 1112 can include hardware, software, or both that connects components of the computing device 1100 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, utilizing an image encoder, an image vector representation from an image depicting a subject;
utilizing a local implicit image function neural network to generate a continuous class label probability distribution for one or more class labels from the image vector representation; and
creating a semantic segmentation mask for the image comprising one or more labeled semantic regions based on the continuous class label probability distribution.

2. The computer-implemented method of claim 1, further comprising utilizing the continuous class label probability distribution for the one or more class labels to determine a class prediction for a coordinate between pixels of the image.

3. The computer-implemented method of claim 1, further comprising:
generating an unfolded image vector representation from the image vector representation utilizing an unfolding operation;
generating a reduced channel image vector representation by utilizing one or more multilayer perceptron decoders to reduce channels of the unfolded image vector representation; and
generating the continuous class label probability distribution for the one or more class labels from the reduced channel image vector representation.

4. The computer-implemented method of claim 1, further comprising:
generating a global pool feature vector from the image vector representation utilizing global pooling; and
generating the continuous class label probability distribution for the one or more class labels from the global pool feature vector.

5. The computer-implemented method of claim 1, wherein the image encoder comprises:
a residual block comprising instance normalization layers and convolution layers; and
strided convolution layers between one or more residual blocks.

6. The computer-implemented method of claim 1, further comprising:
selecting a plurality of upsample coordinates for generating the semantic segmentation mask at an upsampled resolution; and
creating the semantic segmentation mask by generating semantic label predictions at the plurality of upsample coordinates utilizing the continuous class label probability distribution.

7. The computer-implemented method of claim 1, further comprising utilizing the semantic segmentation mask to edit the one or more labeled semantic regions in the image.

8. The computer-implemented method of claim 1, further comprising learning parameters of the local implicit image function neural network utilizing an edge-aware loss using a ground truth image with edges for known semantic regions of the ground truth image.

9. A system comprising:
a memory component comprising an image depicting a subject, a convolutional image encoder, and a local implicit image function neural network; and
a processing device coupled to the memory component, the processing device to perform operations comprising:
generating, utilizing the convolutional image encoder, an image vector representation from the image depicting the subject;
generating, utilizing the local implicit image function neural network, a continuous class label probability distribution for one or more class labels from the image vector representation;
selecting a plurality of upsample coordinates for generating a semantic segmentation mask at an upsampled resolution; and
creating a semantic segmentation mask by generating semantic label predictions at the plurality of upsample coordinates utilizing the continuous class label probability distribution.

10. The system of claim 9, wherein the operations further comprise generating the image depicting the subject by downsampling a higher resolution image depicting the subject.

11. The system of claim 9, wherein the operations further comprise utilizing the continuous class label probability distribution for the one or more class labels to determine a class prediction for an upsample coordinate from the plurality of upsample coordinates between pixels of the image.

12. The system of claim 9, wherein the operations further comprise generating, utilizing the local implicit image function neural network, the continuous class label probability distribution by utilizing a reduced channel image vector representation based on the image vector representation and a global pool feature vector based on the image vector representation.

13. The system of claim 9, wherein the convolutional image encoder comprises a residual block comprising instance normalization layers and convolution layers.

14. The system of claim 9, wherein the semantic segmentation mask comprises one or more labeled semantic regions based on the semantic label predictions at the plurality of upsample coordinates and wherein the operations further comprise utilizing the semantic segmentation mask to edit the one or more labeled semantic regions in a higher resolution image of the image.

15. A non-transitory computer-readable medium storing instructions that, when executed by at least one processor, cause the at least one processor to perform operations comprising:
generating, utilizing an image encoder, an image vector representation from an image depicting a human face;
generating, utilizing a local implicit image function neural network, a continuous class label probability distribution for one or more facial feature labels; and
creating a semantic segmentation mask for the image comprising one or more labeled facial feature regions based on the continuous class label probability distribution.

16. The non-transitory computer-readable medium of claim 15, wherein the one or more facial feature labels comprise an eye label, a nose label, a lips label, a skin label, an eyebrows label, a teeth label, and a hair label.

17. The non-transitory computer-readable medium of claim 15, wherein the operations further comprise utilizing the continuous class label probability distribution for the one or more facial feature labels to determine a facial feature prediction for a coordinate between pixels of the image.

18. The non-transitory computer-readable medium of claim 15, wherein the operations further comprise generating, utilizing the local implicit image function neural network, the continuous class label probability distribution based on:
- a reduced channel image vector representation generated utilizing one or more multilayer perceptron decoders with the image vector representation; and
- a global pool feature vector generated utilizing global pooling on the image vector representation.

19. The non-transitory computer-readable medium of claim 15, wherein the operations further comprise creating the semantic segmentation mask at an upsampled resolution by generating semantic label predictions at a plurality of upsample coordinates utilizing the continuous class label probability distribution.

20. The non-transitory computer-readable medium of claim 15, wherein the operations further comprise utilizing the semantic segmentation mask to edit the one or more labeled facial feature regions in the image.

* * * * *